US008831939B2

(12) United States Patent
Obuchi et al.

(10) Patent No.: US 8,831,939 B2
(45) Date of Patent: Sep. 9, 2014

(54) VOICE DATA TRANSFERRING DEVICE, TERMINAL DEVICE, VOICE DATA TRANSFERRING METHOD, AND VOICE RECOGNITION SYSTEM

(75) Inventors: Yasunari Obuchi, Kodaira (JP); Takeshi Homma, Fuchu (JP)

(73) Assignee: Clarion Co., Ltd, Saitama (JP)

( * ) Notice: Subject to any disclaimer, the term of this patent is extended or adjusted under 35 U.S.C. 154(b) by 259 days.

(21) Appl. No.: 13/530,149

(22) Filed: Jun. 22, 2012

(65) Prior Publication Data

US 2012/0330651 A1    Dec. 27, 2012

(30) Foreign Application Priority Data

Jun. 22, 2011    (JP) .................................. 2011-138318

(51) Int. Cl.
*G10L 15/00*    (2013.01)
*G10L 15/20*    (2006.01)

(52) U.S. Cl.
USPC ............................ 704/233; 704/226; 704/231

(58) Field of Classification Search
CPC ............................... G10L 15/00; G10L 15/20
USPC ........................................ 704/226, 231, 233
See application file for complete search history.

(56) References Cited

U.S. PATENT DOCUMENTS

| | | | | |
|---|---|---|---|---|
| 6,937,980 | B2 * | 8/2005 | Krasny et al. ................. | 704/231 |
| 7,181,392 | B2 * | 2/2007 | Gandhi et al. ................ | 704/235 |
| 7,219,050 | B2 * | 5/2007 | Ishikawa et al. ................ | 704/3 |
| 7,289,956 | B2 * | 10/2007 | Yu et al. ........................ | 704/240 |
| 7,653,547 | B2 * | 1/2010 | Kershaw et al. .............. | 704/275 |
| 8,219,396 | B2 * | 7/2012 | Cho et al. ....................... | 704/231 |
| 8,438,030 | B2 * | 5/2013 | Talwar et al. .................. | 704/251 |
| 8,615,393 | B2 * | 12/2013 | Tashev et al. .................. | 704/226 |
| 2006/0095268 | A1 * | 5/2006 | Yano et al. ..................... | 704/275 |

FOREIGN PATENT DOCUMENTS

| | | |
|---|---|---|
| EP | 1 175 060 | 1/2002 |
| JP | 2005-091611 | 4/2005 |

OTHER PUBLICATIONS

European Search Report for Application No. 12173076.6-225, issued on Oct. 11, 2012.
Tan, et al., "Speech Recognition on Mobile Devices", Mar. 25, 2010, pp. 221-237.
Cohen et al., "Speech enhancement for non-stationary noise environments", Signal Processing, vol. 81, pp. 2403-2418, Received Feb. 18, 2001; received in revised form Jun. 26, 2001.

* cited by examiner

*Primary Examiner* — Shaun Roberts
(74) *Attorney, Agent, or Firm* — Antonelli, Terry, Stout & Kraus, LLP.

(57) ABSTRACT

A voice data transferring device intermediates between an in-vehicle terminal and a voice recognition server. In order to check a change in voice recognition performance of the voice recognition server, the voice data transferring device performs a noise suppression processing on a voice data for evaluation in a noise suppression module; transmits the voice data for evaluation to the voice recognition server; and receives a recognition result thereof. The voice data transferring device sets a value of a noise suppression parameter used for a noise suppression processing or a value of a result integration parameter used for a processing of integrating a plurality of recognition results acquired from the voice recognition server, at an optimum value, based on the recognition result of the voice recognition server. This makes it possible to set a suitable parameter even if the voice recognition performance of the voice recognition server changes.

10 Claims, 16 Drawing Sheets

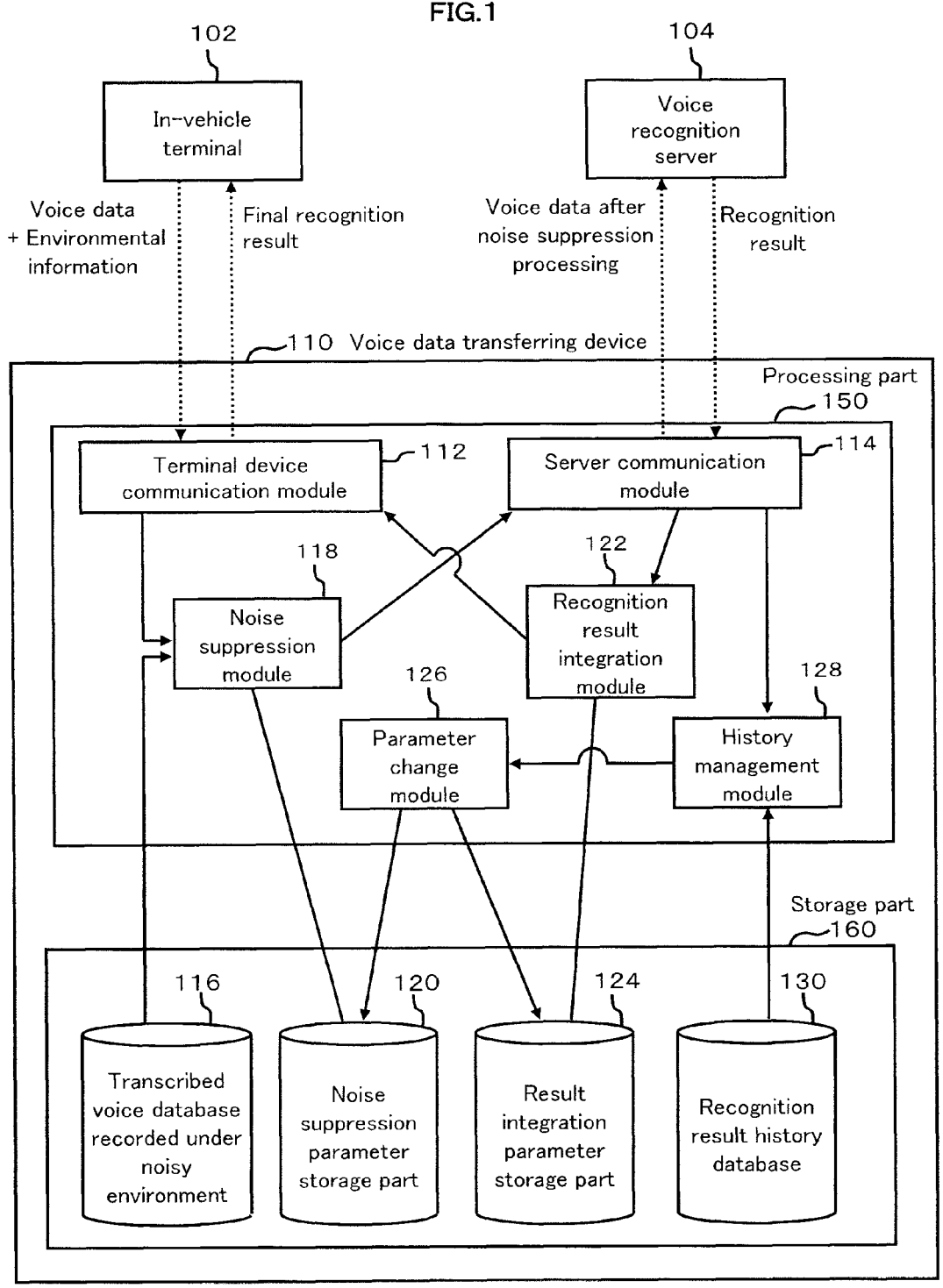

FIG.2

116 Transcribed voice database recorded under noisy environment

| In-vehicle Terminal ID | Voice File | Speech Content | Environmental Information |
|---|---|---|---|
| 12345 | 001. wav | Tokyo station | Engine stopped |
| | 002. wav | Tokyo Metropolitan Government Building | Driving at 80 km/h |
| | 003. wav | Haneda Airport | Idling |
| | 004. wav | Choufu Interchange | Driving at 40 km/h, Listening to radio |
| | 005. wav | Hibiya Park | Idling |
| | 006. wav | Rainbow Bridge | Driving at 80 km/h, Wiper turned on |
| | 007. wav | Shibuya station | Driving at 70 km/h |

FIG.3

120 Noise suppression parameter storage part

| In-vehicle Terminal ID | Environmental Information | Server ID | Noise Suppression Parameter |
|---|---|---|---|
| 12345 | While stopped | X | 0. 2 |
| | | Y | 0. 3 |
| | | Z1 | 0. 5 |
| | | Z2 | 0. 2 |
| | While driving | X | 0. 9 |
| | | Y | 0. 7 |
| | | Z1 | 0. 7 |
| | | Z2 | 0. 3 |

FIG.4

130 Recognition result history database

| Voice File | Server ID | Noise Suppression Parameter | Recognition Score | Recognition Results | | | | |
|---|---|---|---|---|---|---|---|---|
| | | | | 1st | 2nd | 3rd | 4th | 5th |
| 001.wav | X | 0.8 | 0.95 | toukyoueki | kyoutoeki | tokkyo | ukyou | touyo uchou |
| 001.wav | Y | 0.3 | 0.78 | kyoutoeki | toukaieki | touyaeki | toukyoutochou | touky oueki |
| 001.wav | Z1 | 0.7 | 0.82 | toukyouto | toukyoueki | tokyou | tokkyo | kyoutoeki |
| 001.wav | Z2 | 0.2 | 0.88 | toukyoueki | tokyou | tokkyo | kyoutoeki | kyoutofu |
| 002.wav | X | 0.8 | 0.92 | tochou | touchou | touchou | touchi | tochuu |
| 002.wav | Y | 0.3 | 0.79 | tochoumae | tochigi | touma | choufueki | fuchuueki |

FIG.5

124 Result integration parameter storage part

| In-vehicle Terminal ID (501) | Environmental Information (502) | Server ID (503) | Noise Suppression Parameter (504) |
|---|---|---|---|
| 12345 | While stopped | X | 1.0 |
| | | Y | 1.1 |
| | | Z1 | 0.9 |
| | | Z2 | 0.7 |
| | While driving | X | 1.3 |
| | | Y | 0.7 |
| | | Z1 | 1.1 |
| | | Z2 | 0.5 |

VOICE DATA TRANSFERRING DEVICE, TERMINAL DEVICE, VOICE DATA TRANSFERRING METHOD, AND VOICE RECOGNITION SYSTEM

CLAIM OF PRIORITY

The present application claims priority from Japanese Patent Application JP 2011-138318 filed on Jun. 22, 2011, the content of which is hereby incorporated by reference into this application.

BACKGROUND OF THE INVENTION

1. Field of the Invention

The present invention relates to a technique of detecting a change in a voice recognition function and processing a voice signal to be recognized such that the voice signal to be recognized is adapted to the change.

2. Description of the Related Art

Terminal devices of in-vehicle information technology instruments, mobile phones, or the like in which is built a voice recognition function have been developed in order for a user to operate such a terminal device by his/her voice. Recently, due to the development of data communication technology, a voice recognition method with higher accuracy has been widely available, in which a voice uttered by a user is inputted into a terminal device and is transmitted as a voice data to a voice recognition server via a network, and an abundant calculation resource of the voice recognition server is used for a voice recognition. The voice recognition always involves a risk of false recognition owing to effects of indistinct utterance of a user, background noise, or the like. If a user continues to operate an instrument for voice recognition without realizing a false recognition, user's convenience is greatly damaged. Thus, for example, Japanese Laid-Open Patent Application, Publication No. 2005-091611 (see, for example, paragraph 0012) discloses a technique in which, based on an amount of a noise contained in an uttered voice and information on a cause of occurrence of the noise, only an uttered voice which is determined to be voice-recognizable is targeted for a voice recognition.

As described above, more and more voice recognition servers are operated as a generally available service in recent years. In many of those cases, an entity which provides a service for a terminal device handled by a user is different from an entity which operates a voice recognition server. Thus, in some cases, if a voice recognition function of the voice recognition server is changed, the user may not notice the change. Further, even if a provider of a service is at the same time an operator performs the service, because an internal state (for example, an amount of processing load) of a voice recognition server varies from moment to moment, it may be difficult to completely and continuously monitor a change in voice recognition performance. In this case, if a service of a voice recognition function is continuously provided to a user and, for example, voice recognition performance of a voice recognition server used becomes lower for some reason, a reduction in the voice recognition performance cannot be detected. As a result, the user may be provided with a low-quality voice recognition service.

If a voice data transmitted from a terminal device to a voice recognition server is subjected to some data manipulation processing in order to obtain better voice recognition performance, a change in the voice recognition performance of the voice recognition server may reduce effects of the data manipulation processing or may lower the voice recognition performance compared to a case in which the data manipulation processing is not performing.

In the light of the described above, the present invention has been made in an attempt to provide a voice recognition service with a stable quality.

SUMMARY OF THE INVENTION

To solve the above-described problems, provided in the present invention is a voice data transferring device which intermediates between an in-vehicle terminal and a voice recognition server. In order to evaluate voice recognition performance of the voice recognition server, the voice data transferring device transmits a voice data for evaluation to the voice recognition server and receives a recognition result therefrom. The voice data transferring device then determines whether or not there is any change in the voice recognition server, based on the received recognition result. If the voice data transferring device determines that there is a change, the voice data transferring device changes a parameter value used for a data manipulation processing on the voice data received from the terminal device, to a value which improves the voice recognition performance.

A voice recognition service with a stable quality can be provided in the present invention.

BRIEF DESCRIPTION OF THE DRAWINGS

FIG. 1 is a block diagram illustrating a voice data transferring device according to an embodiment of the present invention.

FIG. 2 is a diagram illustrating an example of a transcribed voice database recorded under noisy environment according to the embodiment.

FIG. 3 is a diagram illustrating an example of a data stored in a noise suppression parameter storage part according to the embodiment.

FIG. 4 is a diagram illustrating an example of a recognition result history database according to the embodiment.

FIG. 5 is a diagram illustrating an example of a data stored in a result integration parameter storage part according to the embodiment.

DETAILED DESCRIPTION OF THE INVENTION

Figure 6:
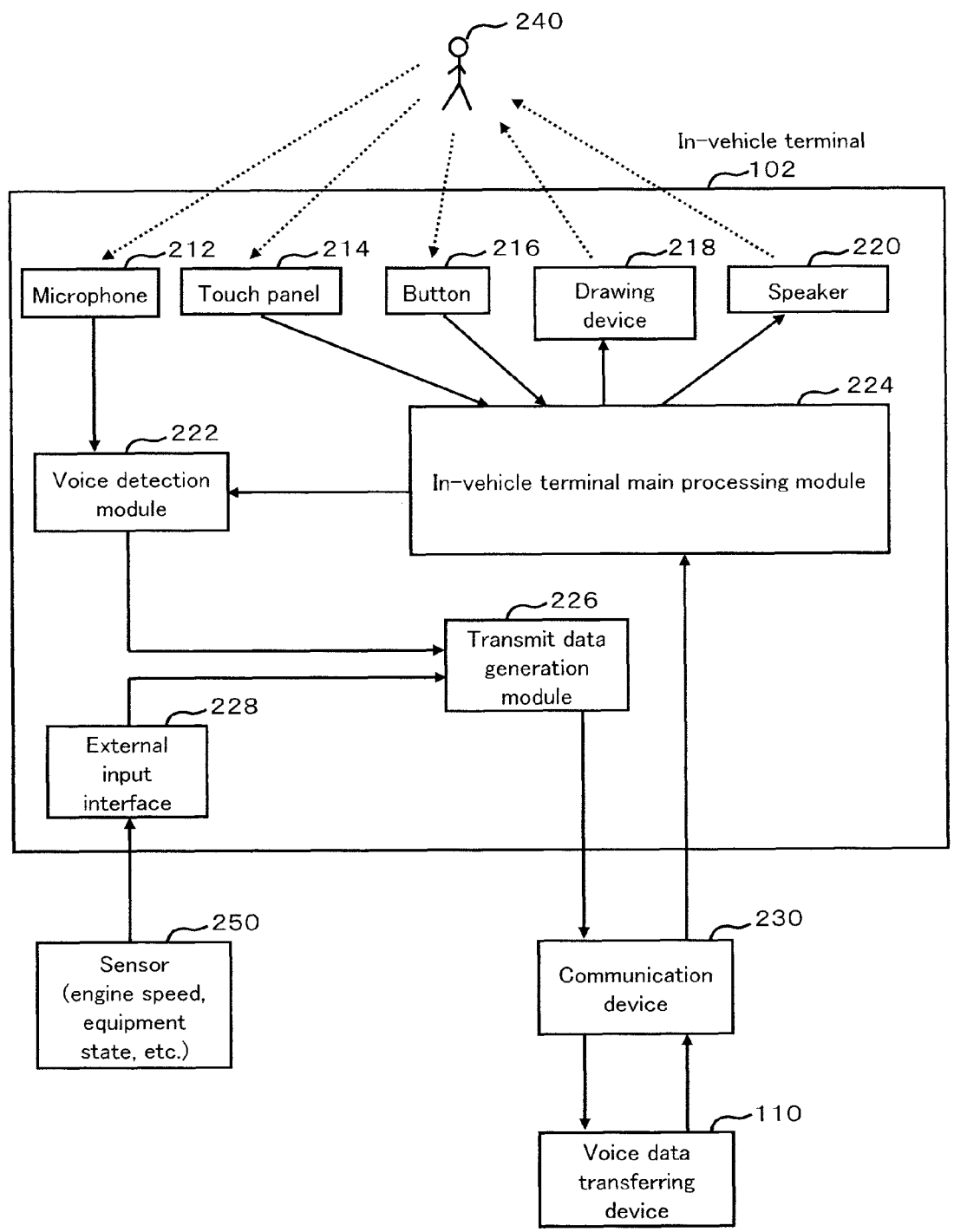
FIG. 6 is a block diagram illustrating a configuration of an in-vehicle terminal according to the embodiment.

Below are described in detail a voice data transferring device, a terminal device, and a voice data transferring method according to an exemplary embodiment of the present invention with reference to attached drawings.

<Outline of Voice Data Transferring Device 110>

Processings in the voice data transferring device 110 according to this embodiment are outlined with reference to FIG. 1. The voice data transferring device 110 includes a terminal device communication module 112, a server communication module 114, a transcribed voice database recorded under noisy environment 116, a noise suppression module 118, a noise suppression parameter storage part 120, a recognition result integration module 122, a result integration parameter storage part 124, a parameter change module 126, a history management module 128, and a recognition result history database 130.

The voice data transferring device 110 is connected to the in-vehicle terminal 102, which is an example of a terminal device, via the terminal device communication module 112 and receives a voice data and environmental information (for example, information on a vehicle-driving condition or the like) transmitted from the in-vehicle terminal 102. The noise suppression module 118 of the voice data transferring device 110 suppresses noise contained in the received voice data and transmits the voice data to the server communication module 114. Note that the noise suppression module 118 performs a noise suppression processing (which may also be referred to as a processing of data manipulation), using a noise suppression parameter (which may also be referred to as a first parameter) stored in the noise suppression parameter storage part 120. In the noise suppression processing, for example, a speech waveform of a voice data is analyzed to calculate an analysis parameter. A value of the analysis parameter is adjusted such that noise is suppressed. The adjusted analysis parameter value is then used for regenerating the speech waveform. The voice data transferring device 110 transmits the voice data having been subjected to the noise suppression processing, via the server communication module 114 to the voice recognition server 104 in which a voice recognition processing is performed, and, in response, receives a recognition result from the voice recognition server 104. The voice data transferring device 110 reevaluates (integrates) the received recognition result and transmits the reevaluated (integrated) result as a final recognition result, to the in-vehicle terminal 102 via the terminal device communication module 112, using a result integration parameter stored in the result integration parameter storage part 124. That is, the voice data transferring device 110 intermediates between the in-vehicle terminal 102 and the voice recognition server 104.

In order to check a change in the voice recognition performance of the voice recognition server 104, the voice data transferring device 110 also inputs a voice data for evaluation stored in the transcribed voice database recorded under noisy environment 116, into the noise suppression module 118 in prescribed cycles. The input is made while no voice data is inputted from the in-vehicle terminal 102. The voice data transferring device 110 then transmits the voice data for evaluation having been subjected to the noise suppression processing, to the voice recognition server 104 via the server communication module 114. The voice data transferring device 110 receives a recognition result of the voice data for evaluation having been subjected to the noise suppression processing, from the voice recognition server 104. The voice data transferring device 110 also determines, in the history management module 128 thereof, whether or not there is any change in the voice recognition performance of the voice recognition server 104, based on the recognition result received from the voice recognition server 104. More specifically, the history management module 128 references the recognition result history database 130 in which a voice data having been previously manipulated in the voice recognition server 104 and a recognition result thereof are stored in association with each other, to thereby determine whether or not there is any change in the recognition result. If the history management module 128 determines that there is a meaningful change in the voice recognition performance (for example, a reduction in the voice recognition performance), the history management module 128 starts up the parameter change module 126 and optimizes each parameter stored in the noise suppression parameter storage part 120 and the result integration parameter storage part 124 (in other words, makes a change such that the voice recognition performance of the voice recognition server 128 is recovered).

As described above, because the voice data transferring device 110 intermediates between the in-vehicle terminal 102 and the voice recognition server 104, the in-vehicle terminal 102 can enjoy a voice recognition service with a stable quality. Note that FIG. 1 illustrates one unit of the voice recognition server 104, however, a plurality of units of the voice recognition servers 104 may be used.

<Functions of Voice Data Transferring Device 110>

Next are described functions of respective components of the voice data transferring device 110.

The voice data transferring device 110 includes: a processing part 150 which has a CPU (Central Processing Unit) and a main memory both not shown; and a storage part 160 which stores therein an application program or the like. The processing part 150 loads the application program or the like stored in the storage part 160 into the main memory, to thereby realize the terminal device communication module 112, the server communication module 114, the noise suppression module 118, the recognition result integration module 122, the parameter change module 126, and the history management module 128. The processing part 150 also performs other various processings which are not realized by those modules and provides control of information transmission and receipt between the modules as well as between each module and the storage part 160. The storage part 160 includes the transcribed voice database recorded under noisy environment 116, the noise suppression parameter storage part 120, the result integration parameter storage part 124, and the recognition result history database 130.

Next are described functions of the respective modules of the voice data transferring device 110.

When a user (not shown) of the in-vehicle terminal 102 uses a voice recognition function of the in-vehicle terminal 102, the terminal device communication module 112 has a function of receiving a voice data and environmental information transmitted from the in-vehicle terminal 102 and outputting the received voice data and environmental information to the noise suppression module 118. The terminal device communication module 112 also has a function of transmitting a final recognition result received from the recognition result integration module 122, to the in-vehicle terminal 102.

The noise suppression module 118 receives the voice data and the environmental information received from the in-vehicle terminal 102, or a voice data for evaluation acquired from the transcribed voice database recorded under noisy environment 116, as an inputted data, and performs a noise suppression processing on the inputted voice data, using a noise suppression parameter (which may also be referred to as a first parameter). For example, a known method disclosed in a non-patent document as follows can be used as a noise suppression processing: I. Cohen and B. Berdugo, "Speech enhancement for non-stationary noise environments", Signal Processing, Vol. 81, pp. 2403-2418 (2001).

The transcribed voice database recorded under noisy environment 116 stores therein a voice data which includes a voice signal whose transcribed speech contents are previously known and to which a noise signal having a known magnitude is added. The voice data stored in the transcribed voice database recorded under noisy environment 116 is used as a voice data for evaluation for determining a change in voice recognition performance. FIG. 2 illustrates an example of the transcribed voice database recorded under noisy environment 116. In FIG. 2, the transcribed voice database recorded under noisy environment 116 contains an in-vehicle terminal ID field 201, a voice file field 202, a speech contents field 203, and an environmental information field 204.

The in-vehicle terminal ID field 201 stores therein an ID for identifying a model type of the in-vehicle terminal 102 which was used for recording a voice data described in the voice file field 202. The voice file field 202 stores therein a file name of the voice data. Note that the voice data as it is can be stored in the voice file field 202. However, because a volume of the voice data is usually large, only a file name thereof is stored. The speech contents field 203 stores therein speech contents corresponding to the voice data as text information. The environmental information field 204 stores therein environmental information at a time when the voice data described in the voice file field 202 was recorded. More specifically, the environmental information field 204 stores therein a vehicle-driving condition or the like (for example, a vehicle speed, a state of audio equipment, a state of a windshield wiper, or any other factor which exerts some influence, large or small, on the voice recognition performance), as environmental information. Details of how to synthesize the voice data for evaluation stored in the transcribed voice database recorded under noisy environment 116 will be described hereinafter (see FIG. 13).

Next is described the noise suppression parameter storage part 120 shown in FIG. 1, with reference to FIG. 3 (see FIG. 1 where necessary). In FIG. 3, the noise suppression parameter storage part 120 contains an in-vehicle terminal ID field 301, an environmental information field 302, a server ID field 303, and a noise suppression parameter field 304. The in-vehicle terminal ID field 301 stores therein information similar to that in the in-vehicle terminal ID field 201 of FIG. 2. The environmental information field 302 stores therein information similar to that in the environmental information field 204 of the FIG. 2. The server ID field 303 stores therein a server ID for identifying the voice recognition server 104. The noise suppression parameter field 304 stores therein a value of a noise suppression parameter used in the noise suppression module 118.

In FIG. 3, the noise suppression parameter storage part 120 stores therein, by the in-vehicle terminal ID and by the environmental information, a value of a noise suppression parameter to be used for each of four voice recognition servers 104, of which server IDs are X, Y, Z1, and Z2. Z1 and Z2 are herein used for the purpose of easy distinction of the following That is, although there is only one voice recognition server 104 having the name of Z, two voice data are obtained by performing the noise suppression processing on one voice data using two different values of a noise suppression parameter (for example, in FIG. 3, 0.5 and 0.2 when the environmental information indicates "while stopped") and are transmitted to the one voice recognition server 104 having the name of Z, which is described as if there were two different voice recognition serves, Z1 and Z2. A value of the noise suppression parameter to the same in-vehicle terminal 102 is stored for each environmental information. This is because it is usually contemplated that, if an environmental condition changes, an optimum value of the noise suppression parameter also changes.

Returning to explanation of FIG. 1, the server communication module 114 has a function of transmitting an output from the noise suppression module 118 to the voice recognition server 104. The server communication module 114 also has functions of receiving a recognition result from the voice recognition server 104 and transmitting the recognition result to the recognition result integration module 122 or the history management module 128.

The voice recognition server 104 is a server which performs a voice recognition processing. The voice recognition server 104 recognizes contents of a voice data received from the voice data transferring device 110 and transmits a result of the recognition back to the voice data transferring device 110. Note that, in this embodiment, the number of units of the voice recognition servers 104 may be one or more.

Let a case be assumed in which one type of voice data is subjected to a noise suppression processing using one or more different noise suppression parameters, and the recognition result integration module 122 receives one or more recognition results corresponding to one or more obtained voice data from one or more voice recognition servers 104. If plural recognition results are obtained and do not match each other, the recognition result integration module 122 reevaluates (integrates) the recognition results while referencing a result integration parameter (which may also be referred to as a second parameter) which has been previously stored in the result integration parameter storage part 124. Such a reevaluation (integration) processing is performed using, for example, a rule of majority as will be describe later. The recognition result integration module 122 transmits the most probable recognition result as a final recognition result to the in-vehicle terminal 102 via the terminal device communication module 112. Note that, if one voice data is subjected to a noise suppression processing using one noise suppression parameter and the recognition result integration module 122 receives one recognition result corresponding to the obtained voice data, from one voice recognition server 104, then, the recognition result integration module 122 transmits the one recognition result as a final recognition result to the in-vehicle terminal 102 via the terminal device communication module 112.

The history management module 128 has functions of: receiving the recognition result transmitted from the voice recognition server 104 via the server communication module 114; comparing the received recognition result with a previously-received recognition result by referencing the recognition result history database 130 in which a voice data having been previously manipulated in the voice recognition server 104 and a recognition result thereof are stored in association with each other; and thereby determining whether or not there is any change in voice recognition performance. If, for example, the history management module 128 determines that there is a meaningful change in the voice recognition performance (for example, reduction in the voice recognition performance) because the received recognition result is different from the past recognition result, the history management module 128 starts up the parameter change module 126 and optimizes each parameter stored in the noise suppression parameter storage part 120 and the result integration parameter storage part 124 (makes a change such that the voice recognition performance of the voice recognition server 128 is recovered).

The recognition result history database 130 stores therein a voice data which has been voice-recognized by the voice recognition server 104 (that is, a voice data for evaluation and a voice data received from the in-vehicle terminal 102) and a recognition result corresponding to the voice data in association with each other.

As shown in FIG. 4, the recognition result history database 130 contains a voice file field 401, a server ID field 402, a noise suppression parameter field 403, a recognition score field 404, and a recognition result field 405. A configuration of the recognition result history database 130 varies depending on which type of format the voice recognition server 104 returns a recognition result. In FIG. 4, it is assumed that the voice recognition server 104 returns a recognition score (a value indicating probability of a recognition result) and the top five candidate words, as the recognition result.

The voice file field 401 stores therein information similar to that in the voice file field 202 of FIG. 2. The server ID field 402 stores therein information similar to that in the server ID field 303 of FIG. 3. The noise suppression parameter field 403 stores therein information similar to that in the noise suppression parameter field 304 of FIG. 3. The recognition score field 404 stores therein a recognition score. The recognition result field 405 stores therein five recognized candidate words (the first to fifth most probable words).

In FIG. 4, a voice data of "001.wav" is transmitted to four voice recognition servers 104 having the name of X, Y, Z1, and Z2, and respective recognition results obtained therefrom are stored. Z1 and Z2 herein mean that, when a voice data is subjected to a noise suppression processing using two different values, 0.7 and 0.2, of a noise suppression parameter and the two obtained voice data are transmitted to the voice recognition server 104 having the name of Z, then, the voice recognition server 104, Z, is nominally regarded as two different voice recognition servers 104, Z1 and Z2.

Returning to explanation of FIG. 1, the parameter change module 126 has a function of starting up itself, based on a start-up instruction from the history management module 128. The parameter change module 126 optimizes (updates) each parameter stored in the noise suppression parameter storage part 120 and the result integration parameter storage part 124, based on a result determined by the history management module 128, such that voice recognition performance of the voice recognition server 128 is improved.

The result integration parameter storage part 124 stores therein a weight to a recognition result which is taken as a result integration parameter (which may also be referred to as a second parameter). The result integration parameter is used when the recognition result integration module 122 reevaluates (integrates) a plurality of recognition results received from the voice recognition server 104. As shown in FIG. 5, the result integration parameter storage part 124 contains an in-vehicle terminal ID field 501, an environmental information field 502, a server ID field 503, and a result integration parameter field 504. The in-vehicle terminal ID field 501 stores therein information similar to that in the in-vehicle terminal ID field 301 of FIG. 3. The environmental information field 502 stores therein information similar to that in the environmental information field 302 of FIG. 3. The server ID field 503 stores therein information similar to that in the server ID field 303 of FIG. 3. The result integration parameter field 504 stores therein a result integration parameter.

In FIG. 5, as an example of the result integration parameter, a real value is assigned as a weight by the environmental information for each of the voice recognition server 104. In this case, a method of integrating recognition results can be used in which, for example, respective weights are assigned to a plurality of recognition results obtained from the voice recognition servers 104, and the rule of majority is conducted on the weighted recognition results.

An example of such a processing by majority performed by the recognition result integration module 122 is described below with reference to FIG. 4 and FIG. 5. The recognition result integration module 122 acquires, for example, four top-ranked candidate words for the voice file "001.wav" of FIG. 4 from the four voice recognition servers 104 (X, Y, Z1, and Z2), which are "toukyoueki", "kyoutoeki", "toukyouto", and "toukyoueki", respectively. The recognition result integration module 122 then references the result integration parameter storage part 124 of FIG. 5 and acquires a weight for each of the voice recognition servers 104. Respective weights are X:1.0, Y:1.1, Z1:0.9, and Z2:0.7. Each weight value by the candidate word as the recognition result is added up to obtain: toukyoueki:1.7 (=X+Z2), kyoutoeki:1.1 (=Y), and toukyouto:0.9 (=Z1). In this case, by majority, "toukyoueki" is determined as the most probable recognition result of the voice data "001.wav".

The rule of majority may be applied only to the first ranked candidates shown in the recognition result field 405 of FIG. 4 as described above or may be applied to plural higher ranked candidates. A weight may be set by combining a recognition score of each candidate word. In place of the rule of majority, candidates may be simply arranged in descending order of weights of the recognition results by the voice recognition server 104.

<Configuration of in-Vehicle Terminal 102>

Next is described a configuration of the in-vehicle terminal 102 with reference to FIG. 6. As shown in FIG. 6, the in-vehicle terminal 102 includes a microphone 212, a touch panel 214, a button 216, a drawing device 218, a speaker 220, a voice detection module 222, an in-vehicle terminal main processing module 224, a transmission data generation module 226, and an external input interface 228. The in-vehicle terminal 102 performs communication with the voice data transferring device 110 via the communication device 230.

If a user 240 uses a voice recognition function of the in-vehicle terminal 102, a microphone 212 picks up a voice (speech) uttered by the user 240 and outputs the voice as a voice data to the voice detection module 222. Further, if the user 240 carries out an operation for calling a voice recognition function, such as pressing the button 216 or the like, the in-vehicle terminal main processing module 224 detects the operation and outputs a result of the detection to the voice detection module 222. The voice detection module 222 has a function of analyzing the voice data of the speech taken from the microphone 212, making use of information received from the in-vehicle terminal main processing module 224, if available. The voice detection module 222 deletes a section without voice in which no voice is present (including a silent section, a section with noise only, and the like) in the voice data and then transmits (only) data in a section with voice in which voice is present, to the transmission data generation module 226.

Note that the voice recognition function in the in-vehicle terminal 102 can be used as an input operation into the in-vehicle terminal 102 and also for other various purposes such as, for example, an input operation into other device peripheral to the in-vehicle terminal 102, a text input into a text editor, a comment box, or the like.

The transmission data generation module 226 combines the data in the section with voice received from the voice detection module 222, with various types of information (environmental information) from the sensor 250 inputted from the external input interface 228, to thereby generate a transmission data which is to be transmitted to the voice data transferring device 110. The transmission data generation module 226 then transmits the transmission data (the voice data plus the environmental information) to the voice data transferring device 110 shown in FIG. 1 via the communication device 230.

The external input interface 228 is an interface which receives various types of information (environmental information) such as: a speed of a vehicle in which the in-vehicle terminal 102 is installed; an output signal from the sensor 250 which detects a state of an audio equipment, a windshield wiper, or the like; and an output signal from the sensor 250 which detects a state of a transmission or an engine speed. The information received by the external input interface 228 is inputted into the transmission data generation module 226 according to necessity (for example, in a case where the voice detection module 222 detects a voice data or the like).

The communication device 230 performs communication between the in-vehicle terminal 102 and the voice data transferring device 110 and can be realized by, for example, a mobile phone having only a communication function, and a so-called smartphone having various functions as information processing equipment. Communication between the in-vehicle terminal 102 and the communication device 230 is carried out using a known technique such as, for example, a USB (Universal Serial Bus) cable and Bluetooth (registered trademark). Communication between the communication device 230 and the voice data transferring device 210 is carried out using, for example, a digital mobile phone network. Similarly, information sent back from the voice data transferring device 110 is transmitted to the in-vehicle terminal main processing module 224 via the communication device 230.

In FIG. 6, there is not so much restriction on a speed or a data amount in exchanging data between the in-vehicle terminal 102 and the communication device 230. Thus, a part of the components described as those installed in the in-vehicle terminal 102 in FIG. 6 may be implemented in the communication device 230. The implementation of a part of the components herein means that, for example, a function performed by the in-vehicle terminal main processing module 224 may be realized by a CPU (not shown) of the communication device 230. Or, a user interface function (not shown) of the communication device 230 may be used as the microphone 212, the touch panel 214, the button 216, the drawing device 218, the speaker 220, or the external input interface 228.

If the user 240 does not use a voice recognition function, the user 240 and the in-vehicle terminal 102 exchange information using the touch panel 214, the button 216, the drawing device 218, the speaker 220, or the like. In other words, when the user 240 operates the in-vehicle terminal 102 or inputs information thereinto, the user uses the touch panel 214 or the button 216. In response to such a user's operation, the in-vehicle terminal 102 changes contents displayed on a screen of the drawing device 218 or plays a voice guidance from the speaker 220. Such functions are carried out in the in-vehicle terminal main processing module 224 which is used for realizing general functions well-known in the art of the in-vehicle terminal 102, such as a route guidance to a destination and an audio equipment operation. Note that the present invention can be realized independently from such a specific embodiment for a processing for realizing the overall functions of the in-vehicle terminal 102.

<Processing of Transferring Voice Data by Voice Data Transferring Device 110>

Figure 7:
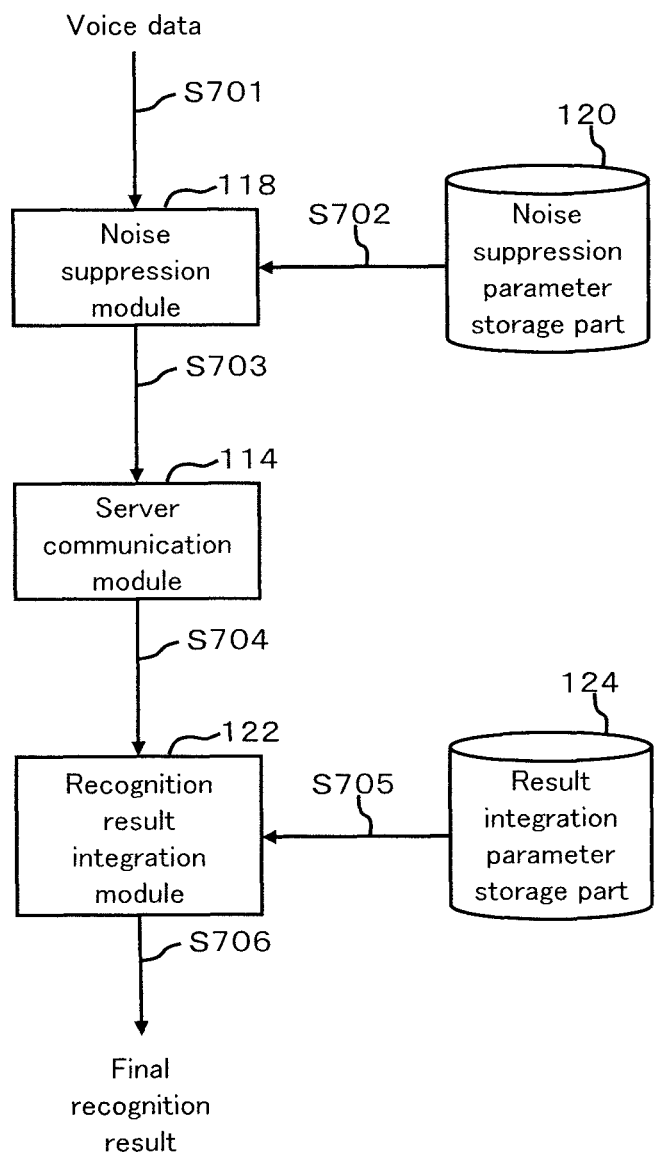
FIG. 7 is an explanatory diagram for explaining a processing of a voice data transferring performed by the voice data transferring device according to the embodiment.

Next is described a processing of transferring a voice data by the voice data transferring device 110 with reference to FIG. 7 (see FIG. 1 and FIG. 6 where necessary). If a voice recognition function is used in the in-vehicle terminal 102, a voice uttered by a user is acquired via the microphone 212 of the in-vehicle terminal 102. The acquired voice data of the uttered voice is transmitted from the in-vehicle terminal 102 to the voice data transferring device 110 and is inputted into the noise suppression module 118 via the terminal device communication module 112 (S701). Herein, together with the voice data, environmental information at the time when the uttered voice was acquired is also transmitted from the in-vehicle terminal 102 to the voice data transferring device 110. The noise suppression module 118 references a value of a noise suppression parameter stored in the noise suppression parameter storage part 120 (S702) and performs a noise suppression processing on the voice data.

The voice data having been subjected to the noise suppression processing is outputted to the server communication module 114 (S703). The server communication module 114 transmits the voice data to the voice recognition server 104 and then receives a recognition result corresponding to the transmitted voice data. The recognition result received by the server communication module 114 is outputted to the recognition result integration module 122 (S704). The recognition result integration module 122 references a value of a result integration parameter stored in the result integration parameter storage part 124 (S705) and reevaluates (integrates) the recognition result. The recognition result reevaluated (integrated) by the recognition result integration module 122 is transmitted to the in-vehicle terminal 102 as a final recognition result (S706).

As described above with reference to FIG. 7, if a voice recognition function is used in the in-vehicle terminal 102, the voice data transferring device 110: performs a noise suppression processing on a received voice data; transmits the voice data to the voice recognition server 104; performs a result integration processing on the recognition result received from the voice recognition server 104; determines the most probable recognition result as a final recognition result; and transmits the final recognition result to the in-vehicle terminal 102.

<Processing of Evaluating Voice Recognition Performance of Voice Recognition Server 104 by Voice Data Transferring Device 110>

Figure 8:
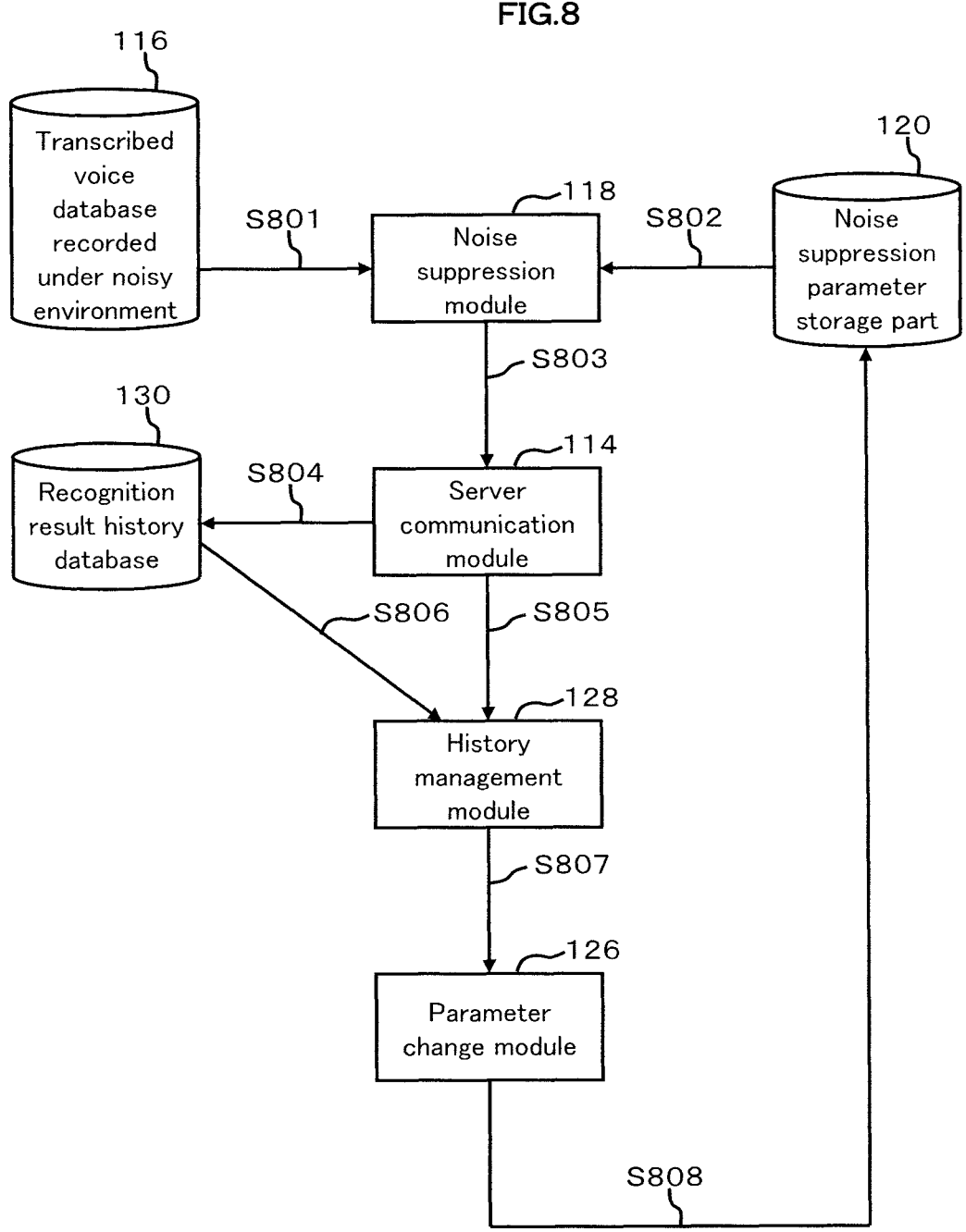
FIG. 8 is an explanatory diagram illustrating an outline of a processing of changing a noise suppression parameter based on an evaluation by a voice recognition server according to the embodiment.

Next is described a processing of evaluating voice recognition performance of the voice recognition server 104 by the voice data transferring device 110 with reference to FIG. 8 (see FIG. 1 and FIG. 6 where necessary). The voice data transferring device 110 evaluates voice recognition performance of the voice recognition server 104 in prescribed cycles using a voice data for evaluation stored in the voice data transferring device 110 itself. The voice data transferring device 110 then optimizes (updates) a parameter for a noise suppression processing or for a result integration processing, into an appropriate value, based on the evaluation result. This is because the voice recognition performance of the voice recognition server 104 varies from moment to moment, and, if the same parameter is always used, the parameter may become unsuited to the voice recognition function of the voice recognition server 104, which increases a risk of reduction in the voice recognition performance.

In this evaluation processing, for example, a server evaluation function (not shown) of the processing part 150 of the voice data transferring device 110 is started up according to a preset time schedule (in prescribed cycles). The transcribed voice database recorded under noisy environment 116 outputs a voice data for evaluation to the noise suppression module 118 (S801).

The noise suppression module 118 acquires a value of a noise suppression parameter for the inputted voice data for evaluation, from the noise suppression parameter storage part 120 (S802) and performs a noise suppression processing. In the simplest case, the noise suppression module 118 performs a noise suppression processing using a single noise suppression parameter and outputs only one type of voice data for evaluation. In a more complicated case, the noise suppression module 118 performs a noise suppression processing sequentially using plural noise suppression parameters and outputs plural types of voice data for evaluation.

In either case described above, the voice data for evaluation having been subjected to the noise suppression processing by the noise suppression module 118 is outputted to the server communication module 114 (S803). The server communication module 114 transmits the received voice data for evaluation to the voice recognition server 104 and, in response, receives a recognition result. The recognition result is stored in the recognition result history database 130 (S804) and is also outputted to the history management module 128 (S805). Note that step S804 may be skipped and, instead, the recognition result may be stored in the recognition result history database 130 via the history management module 128.

The history management module 128 references the recognition result history database 130 and checks the acquired recognition result against a history of a past recognition result for the same voice data for evaluation (S806) and determines whether or not there is any change in the voice recognition performance of the voice recognition server 104. If it is determined that there is some change in the voice recognition performance of the voice recognition server 104, the history management module 128 starts up the parameter change module 126 (S807). The parameter change module 126 estimates a value of the noise suppression parameter which is suited for an internal state of the voice recognition server 104. The obtained parameter value is stored in the noise suppression parameter field 304 of the noise suppression parameter storage part 120 (S808) and is used in the next noise suppression processing by the noise suppression module 118.

Figure 9:
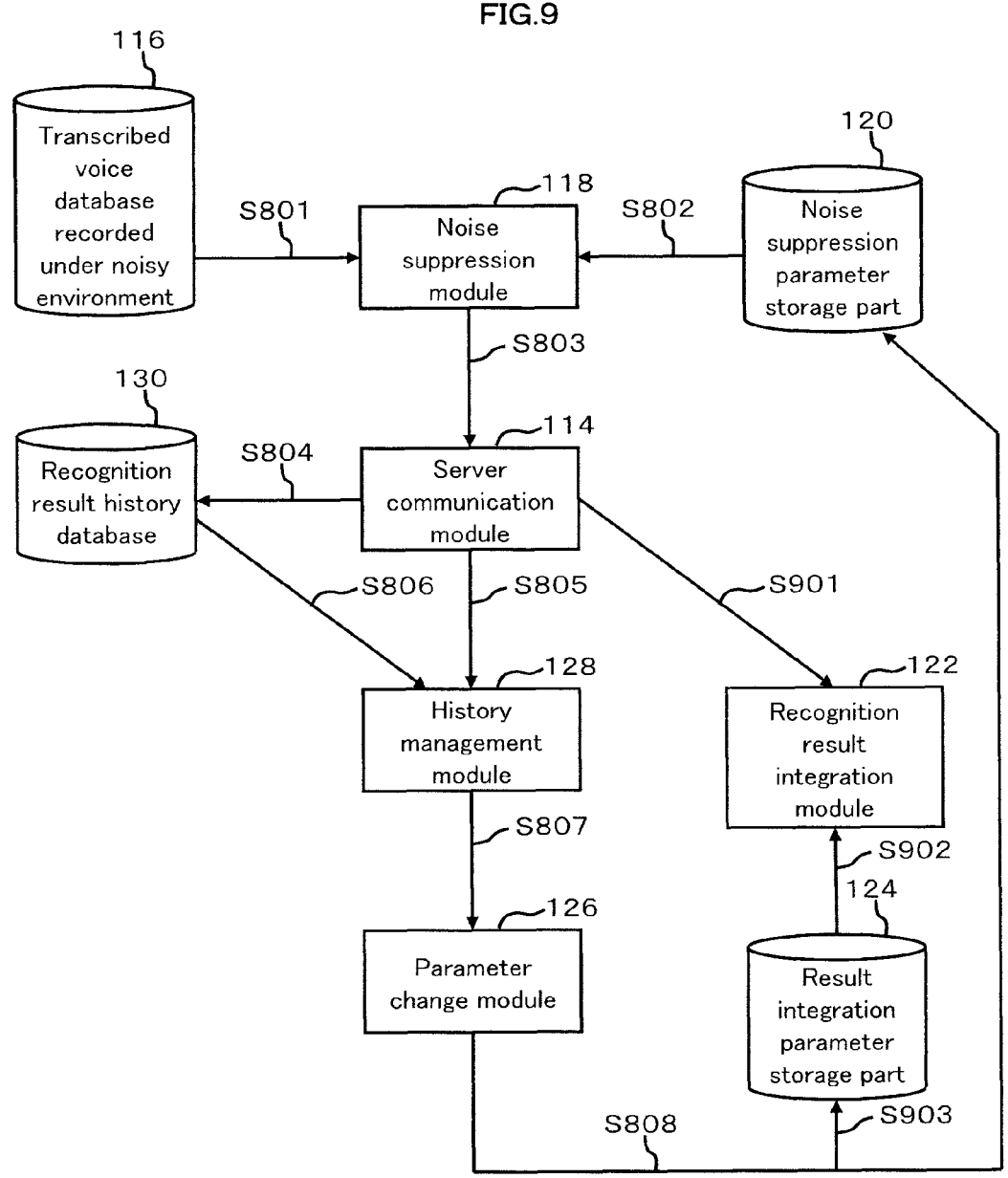
FIG. 9 is an explanatory diagram illustrating an outline of a processing of changing a result integration parameter based on an evaluation by the voice recognition server according to the embodiment.

Next is described an outline of a processing of changing a result integration parameter in the result integration parameter storage part 124 with reference to FIG. 9. A configuration shown in FIG. 9 is the same as that shown in FIG. 8 except that the configuration of FIG. 9 additionally includes the recognition result integration module 122 and the result integration parameter storage part 124.

In FIG. 9, steps S801 to S0808 are similar to those in FIG. 8, and description thereof is omitted herefrom. In FIG. 9, the server communication module 114 transmits a voice data for evaluation having been subjected to the noise suppression processing, to the voice recognition server 104 (see FIG. 1) and, in response, receives a recognition result. Note that the processing of changing a result integration parameter is performed using a plurality of recognition results.

As shown in FIG. 9, the plural recognition results received by the server communication module 114 are outputted not only to the recognition result history database 130 and the history management module 128 (S804, S805) but also to the recognition result integration module 122 (S901). The recognition result integration module 122 references a value of the result integration parameter stored in the result integration parameter storage part 124 (S902), integrates the recognition results, and estimates the most probable recognition result. If the history management module 128 detects a change in an internal state of the voice recognition server 104, the parameter change module 126 optimizes (updates) the referenced and used value of the result integration parameter to a value suited for the internal state of the voice recognition server 104 (S903).

<Methods of Synthesizing Plural Voice Data>

Next are described three methods for obtaining plural recognition results. In method I, the noise suppression module 118 synthesizes plural recognition result voice data using a plurality of noise suppression parameters and receives a recognition result of the plural recognition result voice data from a single unit of the voice recognition server 104. In method II, the noise suppression module 118 transmits one and the same recognition result voice data to a plurality of the voice recognition servers 104 and receives respective recognition results from the plural voice recognition servers 104. In method III, the noise suppression module 118 synthesizes plural recognition results using plural noise suppression parameters and receives recognition results of the plural recognition result voice data from a plurality of voice recognition servers 104. Respective processings in methods I to III are described hereinafter. Details of steps of methods I to III are described with reference to FIG. 10 to FIG. 12, respectively.

Figure 10:
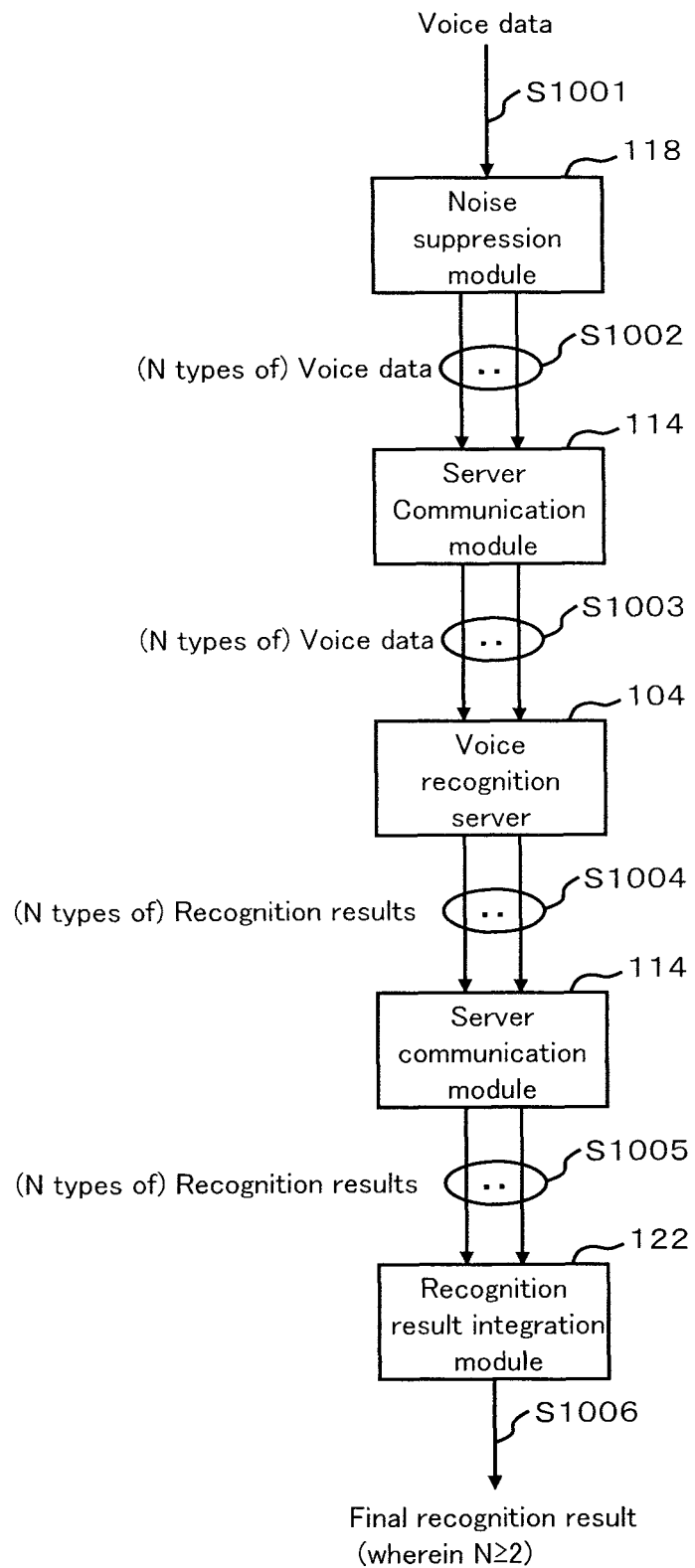
FIG. 10 is an explanatory diagram illustrating an example of a processing flow if one or more voice data is subjected to the processing by one unit of the voice recognition server according to the embodiment.

FIG. 10 illustrates steps of method I. In the steps, plural voice data (including a voice data for evaluation) are synthesized in the noise suppression module 118 using a plurality of noise suppression parameters. A recognition result of the plural voice data is received from a single unit of the voice recognition server 104. As shown in FIG. 10, if one original voice data is inputted into the noise suppression module 118 (S1001), the noise suppression module 118 performs a noise suppression processing on the inputted voice data, applying N types of different noise suppression parameters and outputs plural (N types of) voice data corresponding to the respective parameter values (S1002). The N types of voice data are transmitted to the single voice recognition server 104 via the server communication module 114 (S1003).

The voice recognition server 104 transmits N types of recognition results corresponding to the respective voice data back to the server communication module 114 (S1004). The recognition results received by the server communication module 114 are outputted to the recognition result integration module 122 (S1005). The recognition result integration module 122 integrates the recognition results and outputs an integrated recognition result as a final recognition result (S1006). Note that the N types of recognition results obtained from the voice recognition server 104 are not always different from each other. In not a few cases, correct recognition results are obtained from most of plural voice data, and thus, many of the obtained recognition results are the same.

Figure 11:
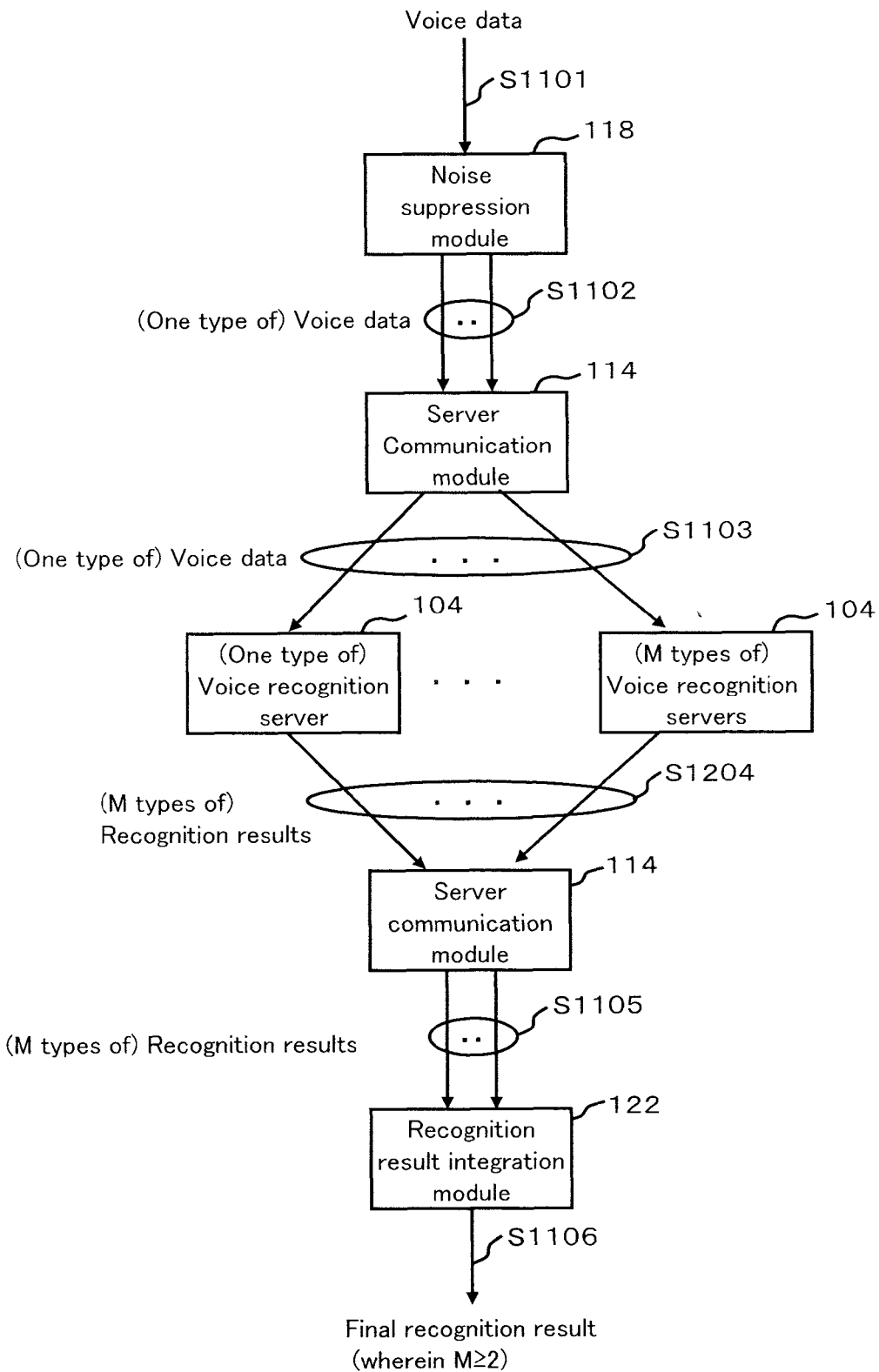
FIG. 11 is an explanatory diagram illustrating an example of a processing flow if one voice data is subjected to the processing by plural units of the voice recognition servers according to the embodiment.

FIG. 11 illustrates steps of method II. In the steps, one and the same original voice data (including a voice data for evaluation) are transmitted to a plurality of voice recognition servers 104. Recognition results are received from the respective voice recognition servers 104. As shown in FIG. 11, if one original voice data is inputted into the noise suppression module 118 (S1101), the noise suppression module 118 performs a noise suppression processing of the inputted original voice data, applying one type of noise suppression parameter and outputs one type of processed voice data (S1102).

The server communication module 114 transmits the one type of processed voice data to plural (M units of) voice recognition servers 104 which are provided independently from each other (S1103). The voice recognition servers 104 transmit respective recognition results corresponding to the voice data back to the server communication module 114 (S1104). The voice recognition servers 104 perform their voice recognitions based on their own algorithm or model and thus transmit M types of respective recognition results to the server communication module 114.

The server communication module 114 outputs the received recognition results to the recognition result integration module 122 (S1105). The recognition result integration module 122 integrates the recognition results and outputs an appropriate final recognition result (S1106).

Figure 12:
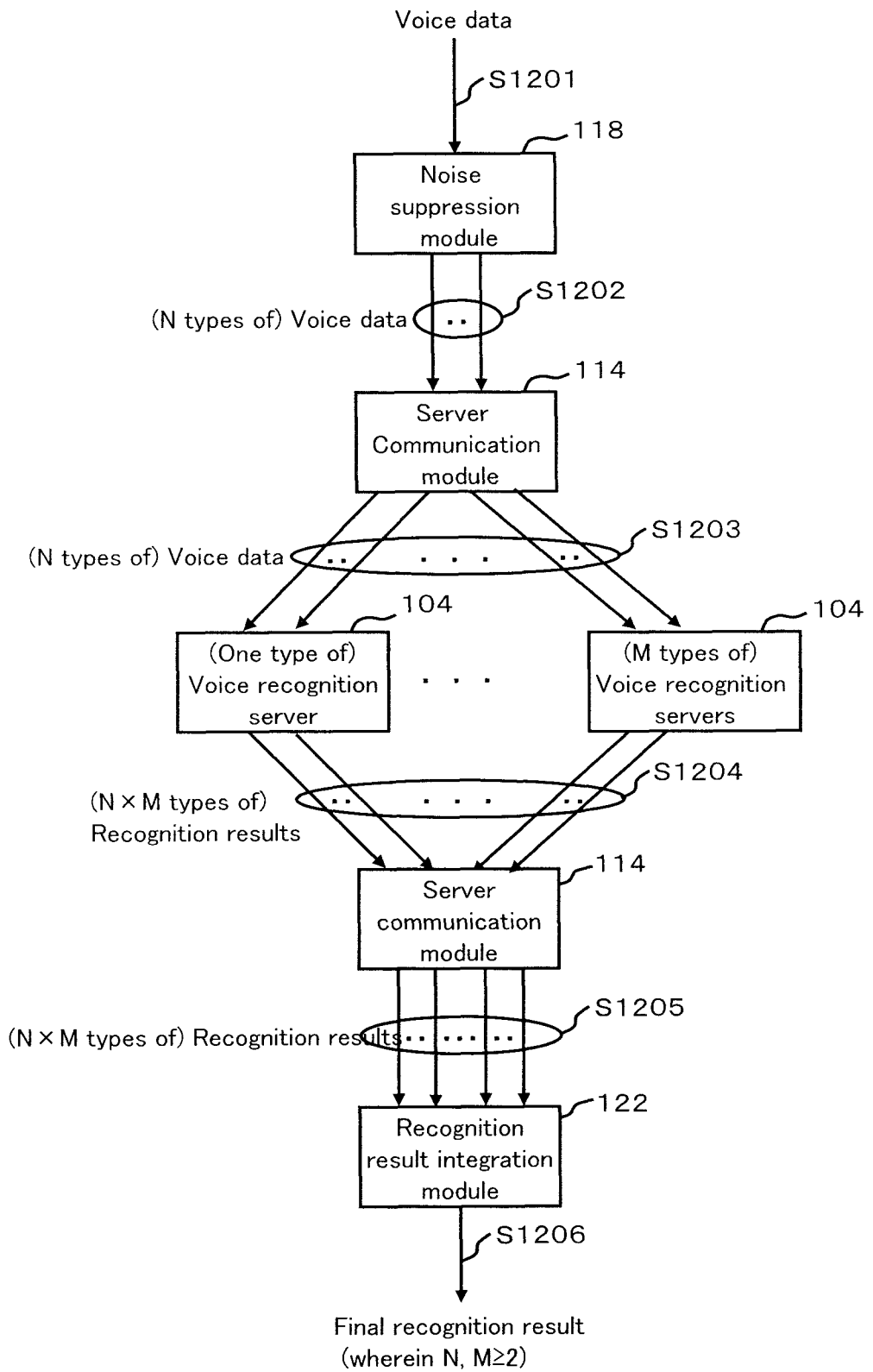
FIG. 12 is an explanatory diagram illustrating an example of a processing flow if plural voice data are subjected to the processing by plural units of the voice recognition servers according to the embodiment.

FIG. 12 illustrates steps of method III. In the steps, plural voice data (including voice data for evaluation) are synthesized in the noise suppression module 118 using a plurality of noise suppression parameters. Recognition results of the plural voice data are received from the plural voice recognition servers 104. As shown in FIG. 12, if one original voice data is inputted into the noise suppression module 118 (S1201), the noise suppression module 118 performs a noise suppression processing of the inputted voice data, applying plural (N types of) noise suppression parameters and outputs N types of voice data (S1202).

The server communication module 114 transmits all of the N types of voice data to the plural (M units of) voice recognition servers 104 which are provided independently from each other (S1203). The voice recognition servers 104 transmit respective recognition results corresponding to the N types of voice data, back to the server communication module 114 (S1204). That is, N×M types of recognition results are transmitted back to the server communication module 114.

The server communication module 114 outputs the received recognition results to the recognition result integration module 122 (S1205). The recognition result integration module 122 integrates the recognition results and outputs an appropriate final recognition result (S1206). Note that, in the above description, all of the numbers of voice data transmitted to respective voice recognition servers 104 are N. However, the numbers do not have to be the same, and different numbers of voice data may be transmitted. For example, five out of N voice data may be transmitted to one voice recognition server 104 and three out of N voice data may be transmitted to another voice recognition server 104.

<Method of Synthesizing Voice Data for Evaluation>

Figure 13:
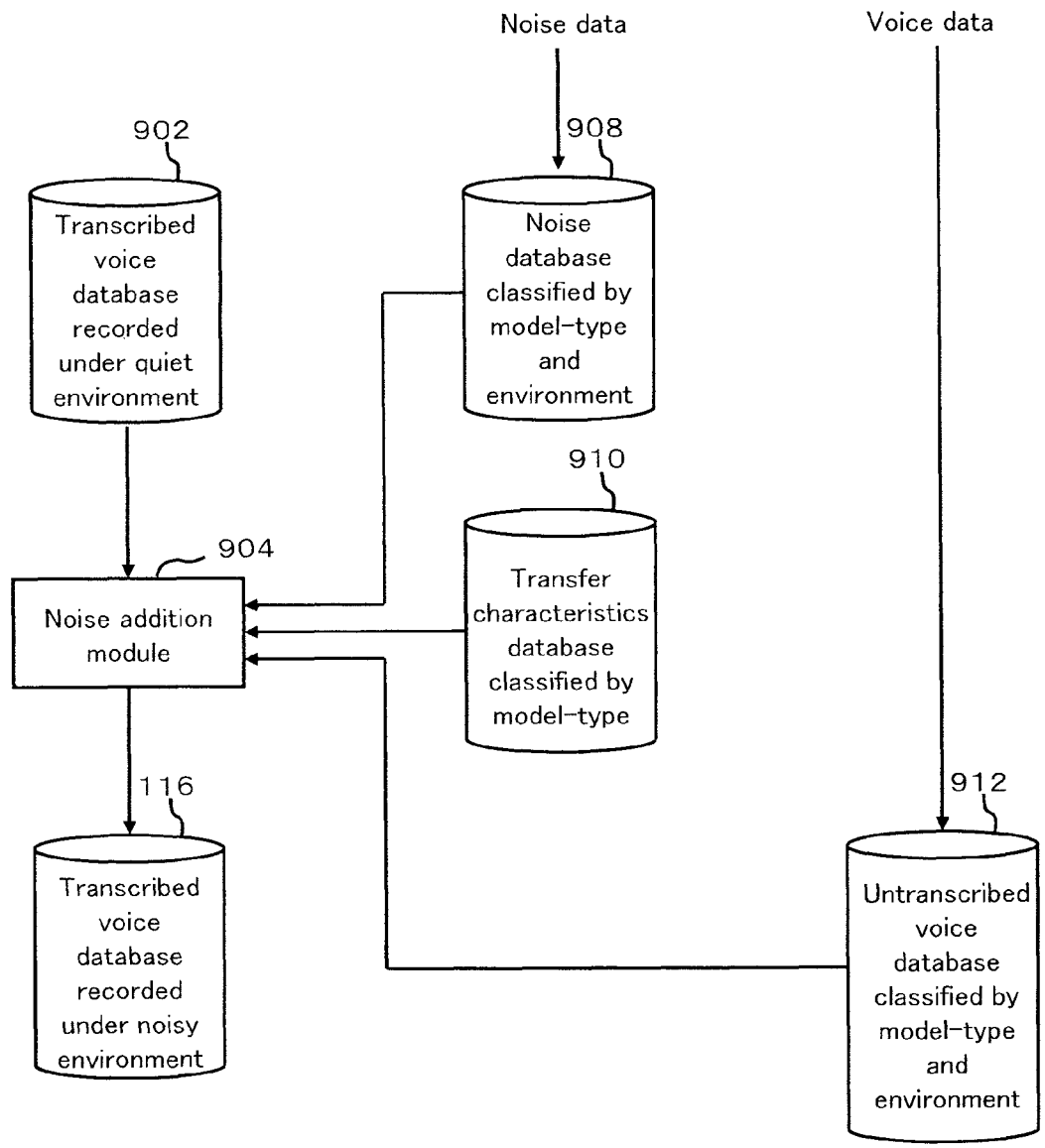
FIG. 13 is an explanatory diagram illustrating a method of synthesizing a speech contents known noise environment voice data according to the embodiment.

Next is described a method of synthesizing a voice data for evaluation stored in the transcribed voice database recorded under noisy environment 116 with reference to FIG. 13 (see FIG. 1 and FIG. 6 where necessary). Data in the transcribed voice database recorded under noisy environment 116 is synthesized using data stored in a transcribed voice database recorded under quiet environment 902, a noise database classified by model-type and environment 908, a transfer characteristics database classified by model-type 910, and an untranscribed voice database classified by model-type and environment 912. In this embodiment, description is made assuming that the data in the transcribed voice database recorded under noisy environment 116 is synthesized in a voice data synthesis means (not shown) of the processing part 150 of the voice data transferring device 110. However, the data may be synthesized in other dedicated device (not shown) installed in a vehicle.

The transcribed voice database recorded under quiet environment 902 stores therein voice data on various words uttered by a variety of speakers which have been previously recorded under quiet environment free from noise. The voice data is stored together with a label for identifying the transcribed contents thereof. The noise database classified by model-type and environment 908 stores therein a noise data which is classified by a model type of the in-vehicle terminal 102 (see FIG. 1) or by an environment such as a vehicle-driving condition. The noise data is acquired via the in-vehicle terminal 102. The in-vehicle terminal 102 constantly accumulates such noise data and transmits the accumulated noise data to the voice data transferring device 110 where appropriate. The voice data transferring device 110 adds the received noise data to the noise database classified by model-type and environment 908.

The transfer characteristics database classified by model-type 910 stores therein a data on transfer characteristics of a voice signal which is captured from a mouth of the user 240 via the microphone 212, for each model type of the in-vehicle terminal 102.

The untranscribed voice database classified by model-type and environment 912 stores therein a voice data which is uttered by a user and is classified by model type of the in-vehicle terminal 102 or by environment. Speech contents of the voice data are not known. The voice data whose speech contents are unknown has been acquired via the in-vehicle terminal 102. The in-vehicle terminal 102 constantly accumulates voice data whose speech contents are unknown and transmits the accumulated voice data to the voice data transferring device 110 where appropriate. The voice data transferring device 110 adds the voice data which is uttered by the user 240 and whose speech contents are unknown, to the untranscribed voice database classified by model-type and environment 912 where necessary, similarly to the noise database classified by model-type and environment 908. Note that the speech contents of the voice data added to the untranscribed voice database classified by model-type and environment 912 are unknown, and, therefore, the voice data does not include a label for identifying the transcribed contents.

A noise addition module 904 performs a processing of adding a noise data acquired from the noise database classified by model-type and environment 908 and a processing of convoluting a transfer characteristics data acquired from the transfer characteristics database classified by model-type 910 (a processing of filtering a voice data according to transfer characteristics), to a voice data stored in the transcribed voice database recorded under quiet environment 902. However, the latter processing of convoluting a transfer characteristics data can be omitted. The former processing of adding a noise is done by multiplying a voice data or a noise data by a specified gain value and adding up amplitudes of waveforms, to thereby adjust a value of a signal-to-noise ratio.

An appropriate value as the signal-to-noise ratio can be estimated by referencing an average power of the voice data stored in the untranscribed voice database classified by model-type and environment 912. That is, the voice data in the untranscribed voice database classified by model-type and environment 912 can be used for estimating how much voice volume a user speaks under a given environment, even if speech contents spoken by the user are unknown. Thus, the voice data transferring device 110 adjusts a gain of a voice data in the transcribed voice database recorded under quiet environment 902 such that the gain corresponds to an average power of a specific amount of voice data contained in the untranscribed voice database classified by model-type and environment 912, to thereby synthesize a voice data having a desired signal-to-noise ratio.

Figure 14:
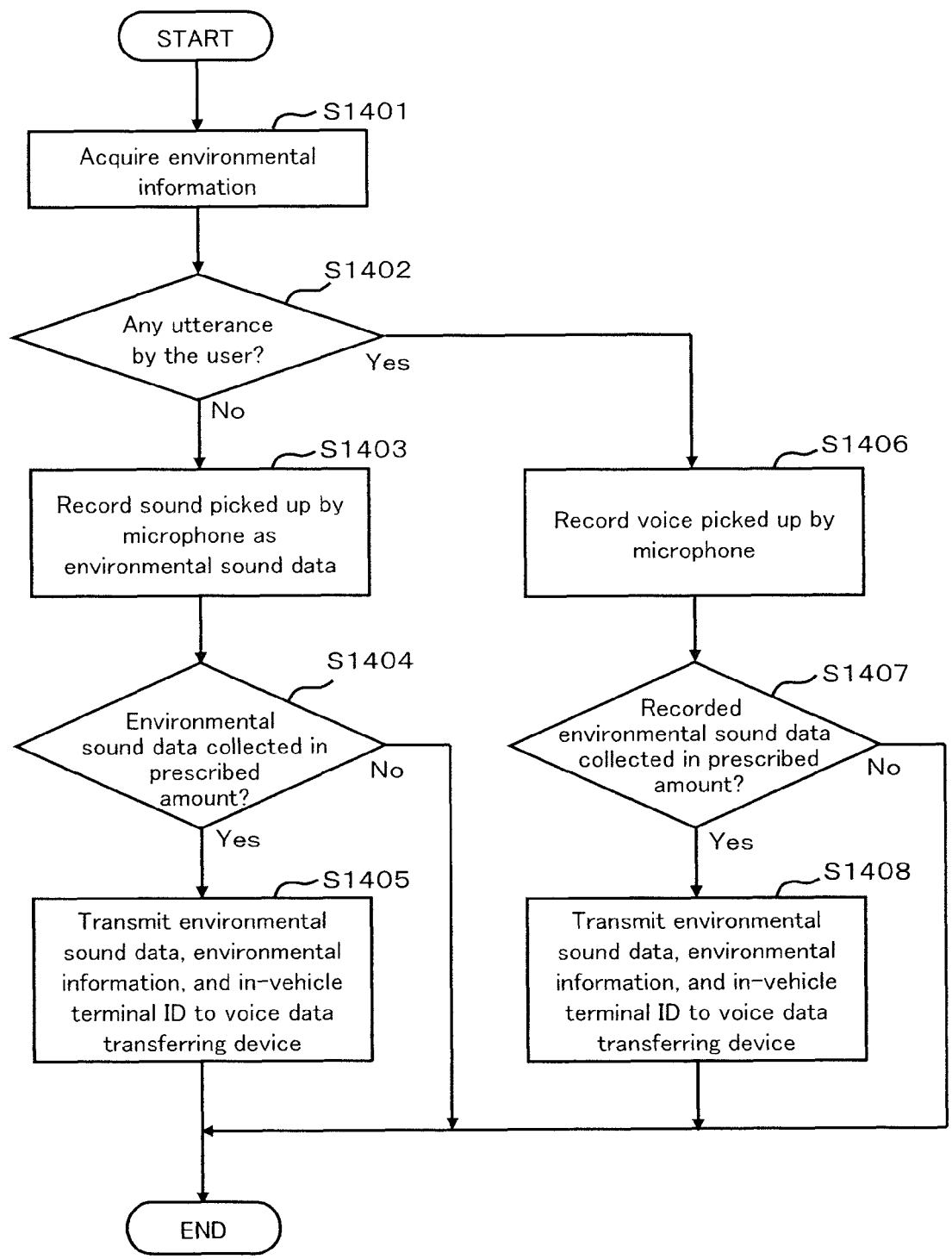
FIG. 14 is a flowchart illustrating steps of a processing of adding a data by the in-vehicle terminal according to the embodiment.

Next is described a flowchart illustrating a processing performed by the in-vehicle terminal 102 and used for adding a data to the noise database classified by model-type and environment 908 and the untranscribed voice database classified by model-type and environment 912, with reference to FIG. 14 (see FIGS. 6 and 13 where necessary). Note that the processing shown in FIG. 14 is continuously performed while a data addition unit (not shown) of the in-vehicle terminal main processing module 224 is in operation.

In FIG. 14, the in-vehicle terminal 102 acquires environmental information on surroundings thereof via the microphone 212 (step S1401). The environmental information used herein means information on operating conditions or the like of a vehicle or peripheral equipment, such as, for example, a vehicle speed, a state of audio equipment, a state of a windshield wiper, or any other factor which may exert some influence, large or small, on the voice recognition. The in-vehicle terminal 102 then determines whether or not there is any utterance by the user (step S1402).

If the in-vehicle terminal 102 determines that there is no utterance by the user (if No in step S1402), the in-vehicle terminal 102 records a sound picked up by the microphone 212 as an environmental sound data (step S1403). The in-vehicle terminal 102 then determines whether or not the recorded environmental sound data has reached (is collected in) a prescribed amount (step S1404). If the in-vehicle terminal 102 determines that the environmental sound data has reached (is collected in) a prescribed amount (if Yes in step S1404), the in-vehicle terminal 102 gives appropriate environmental information and an ID for identifying a model type of the in-vehicle terminal 102, to the environmental sound data, and transmits the environmental sound data with the information and the ID, to the voice data transferring device 110 (step S1405). The processing illustrated in the flowchart then terminates. The environmental sound data transmitted to the voice data transferring device 110 is stored in the noise database classified by model-type and environment 908 (see FIG. 13) as a noise data. On the other hand, if the in-vehicle terminal 102 determines that the environmental sound data has not reached (is collected in) a prescribed amount (if No in step S1404), the in-vehicle terminal 102 skips step S1405 and terminates the processing. A reason why step S1405 is skipped is that, if given environmental information does not continue during a prescribed time period, the environmental information is not taken as an environmental sound data. Note that before the in-vehicle terminal 102 starts recording in step S1403, the in-vehicle terminal 102 deletes a previously-recorded environmental sound data. Alternatively, the in-vehicle terminal 102 may delete the environmental sound data previously recorded in step S1404, after the processing is completed.

Meanwhile, in step S1402, if the in-vehicle terminal 102 determines that there is an utterance by the user (if Yes in step S1402), the in-vehicle terminal 102 records a voice picked up by the microphone 212 (step S1406). The in-vehicle terminal 102 then determines whether or not the recorded environmental sound data has reached (is collected in) a prescribed amount (step S1407). If the in-vehicle terminal 102 determines that the environmental sound data has reached (is collected in) a prescribed amount (if Yes in step S1407), the in-vehicle terminal 102 gives appropriate environmental information and an ID for identifying a model type of the in-vehicle terminal 102, to the voice data environmental voice, and transmits the environmental sound data with the information and the ID, to the data transferring device 110 (step S1408). Then, the processing shown in this flowchart is terminated. The voice data transmitted to the voice data transferring device 110 is stored in the untranscribed voice database classified by model-type and environment 912 (see FIG. 13) as a voice data. On the other hand, if the in-vehicle terminal 102 determines that the environmental sound data has not reached (is collected in) a prescribed amount (if No in step S1407), the in-vehicle terminal 102 skips step S1408 and terminates the processing. A reason why step S1408 is skipped is that, if given environmental information does not continue during a prescribed time period, the environmental information is not taken as a voice data. Note that before the in-vehicle terminal 102 starts recording in step S1406, the in-vehicle terminal 102 deletes a previously-recorded environmental sound data. Alternatively, the in-vehicle terminal 102 may delete the environmental sound data previously recorded in step S1407, after the processing is completed.

Figure 15:
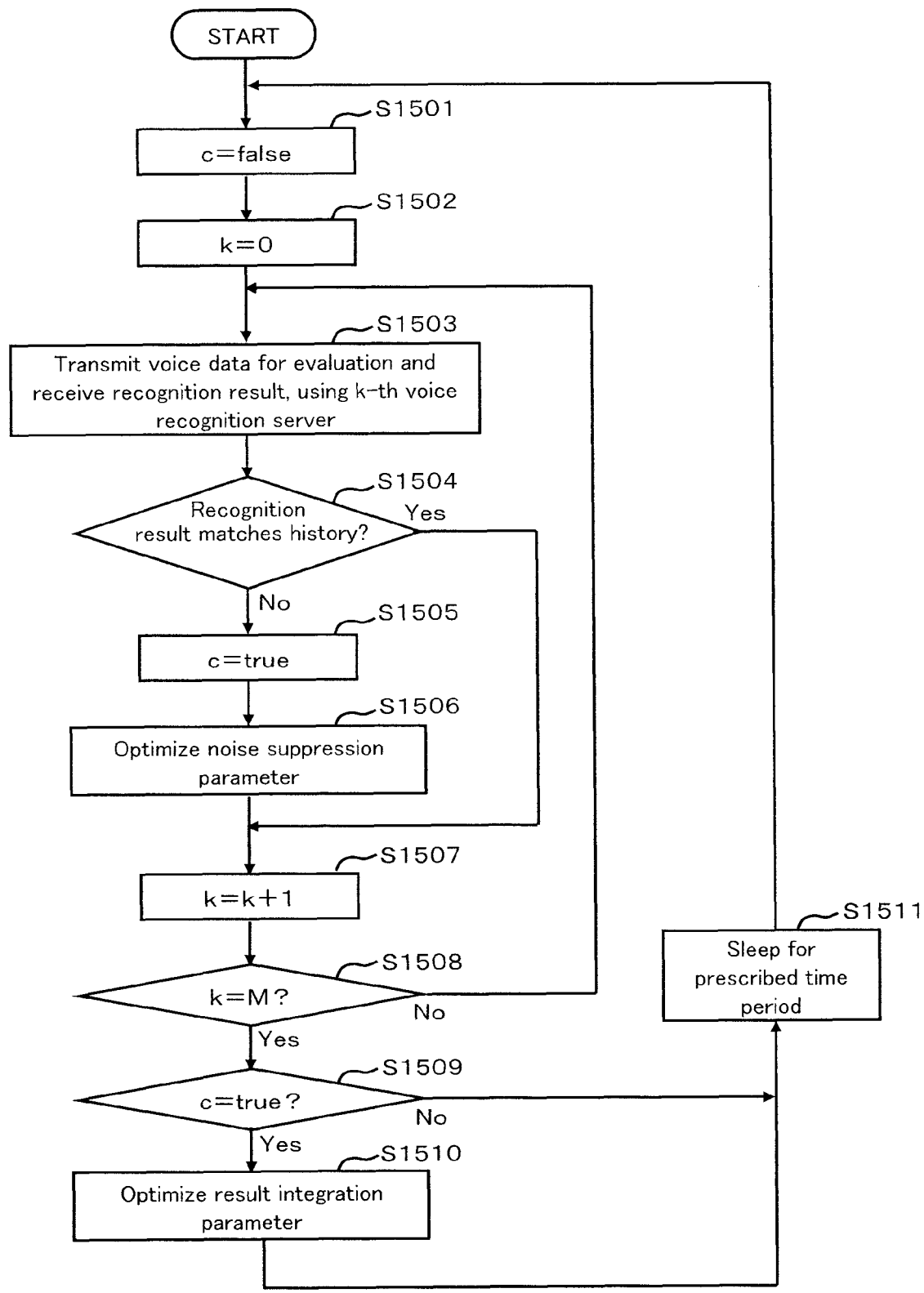
FIG. 15 is a flowchart illustrating detailed steps of a processing of evaluating the voice recognition server according to the embodiment.

Next are described detailed steps of the processing of evaluating the voice recognition server 104 by the voice data transferring device 110, with reference to FIG. 15. In a flowchart of FIG. 15, a variable c indicates whether or not there is any change detected in an internal state of the voice recognition server 104. A variable k is used for identifying the voice recognition server 104.

The voice data transferring device 110 sets a default value of the variable c at "false" which indicates that there is no change detected in the internal state of the voice recognition server 104 (step S1501).

The voice data transferring device 110 sets a default value of the variable k at "0" (step S1502). The voice data transferring device 110 performs, in the noise suppression module 118 thereof, a noise suppression processing on a voice data for evaluation acquired from the transcribed voice database recorded under noisy environment 116 (see FIG. 1); transmits the voice data for evaluation to a k-th voice recognition server 104; and receives a recognition result thereof (step S1503).

The voice data transferring device 110 determines whether or not the recognition result received in step S1503 matches a recognition result having been previously obtained (a history) from the same k-th voice recognition server 104 (step S1504). Note that contents which the voice recognition server 104 returns as a recognition result are likely to take various forms, according to which how to match the results with each other can be set in different ways. For example, in a case where only a single word or sentence is returned as a recognition result, it is typically determined whether or not the word or sentence completely matches a counterpart which is held as a history. However, another way of determining the matching is also possible. For example, one sentence may be determined to match another even if the two sentences are not completely identical but are different by one word. In other case in which a plurality of words are returned as recognition results, there are some different ways of determining the matching. For example, what is checked is: to what extent the first-ranked candidate words (see FIG. 4) match with each other; to what extent the top N-th candidate words match with each other; to what extent all candidate words match with each other; or the like. If, in addition to a word or sentence as a recognition result, a recognition score (see FIG. 4) of the recognition result is returned, whether or not the recognition scores completely match with each other or whether or not a difference between the recognition scores is within a preset tolerable range may be checked.

If the voice data transferring device 110 determines that the recognition result received in step S1503 does not match a counterpart in the history (if No in step S1504), the voice data transferring device 110: determines that a change has been detected; changes the value of the variable c to "true" (step S1505); optimizes a noise suppression parameter (step S1506); and advances the processing to step S1507. Details of how to optimize the noise suppression parameter will be described later (see FIG. 16).

If the voice data transferring device 110 determines that the recognition result received in step S1503 matches the counterpart in the history (if Yes in step 1504), the voice data transferring device 110 determines that there is no change in the internal state of the voice recognition server 104 and advances the processing to step S1507. The voice data transferring device 110 changes the value of the variable k to "k+1" (step S1507) and determines whether or not the changed value of the variable k is identical to M (step S1508). Herein, M is the number of units of the voice recognition servers 104 used for the voice recognition processing. If the voice data transferring device 110 determine that the value of the variable k is not identical to M (if No in step S1508), the processing returns to step S1503. That is, the processing is performed on the next voice recognition server 104.

If the voice data transferring device 110 determines that the value of the variable k is identical to M (if Yes in step 1508), the voice data transferring device 110 determines whether or not the value of the variable c is true (step S1509). If the value of the variable c is determined to be true (if Yes in step S1509), the voice data transferring device 110 determines that there is a change in the internal state of the voice recognition server 104 and optimizes a result integration parameter (step S1510). The voice data transferring device 110 then sleeps for a prescribed time period (step S1511), and then repeats the processing from step S1501 and thereafter. On the other hand, if the value of the variable c is not determined to be true (if No in step 1509), the processing advances to step S1511.

Note that the processing shown in FIG. 15 assumes that a single voice data for evaluation is transmitted to a plurality of the voice recognition servers 104 as shown in FIG. 11. However, as shown in FIG. 10 and FIG. 12, even if the noise suppression module 118 outputs a plurality of voice data for evaluation, a similar flow of the processing is applicable. Further, the processing shown in FIG. 15 is also applicable to a combination of a voice data for evaluation subjected to a noise suppression processing using a single noise suppression parameter and a single unit of the voice recognition server 104, except that optimization of a result integration parameter is not necessary (see step S1510).

Figure 16:
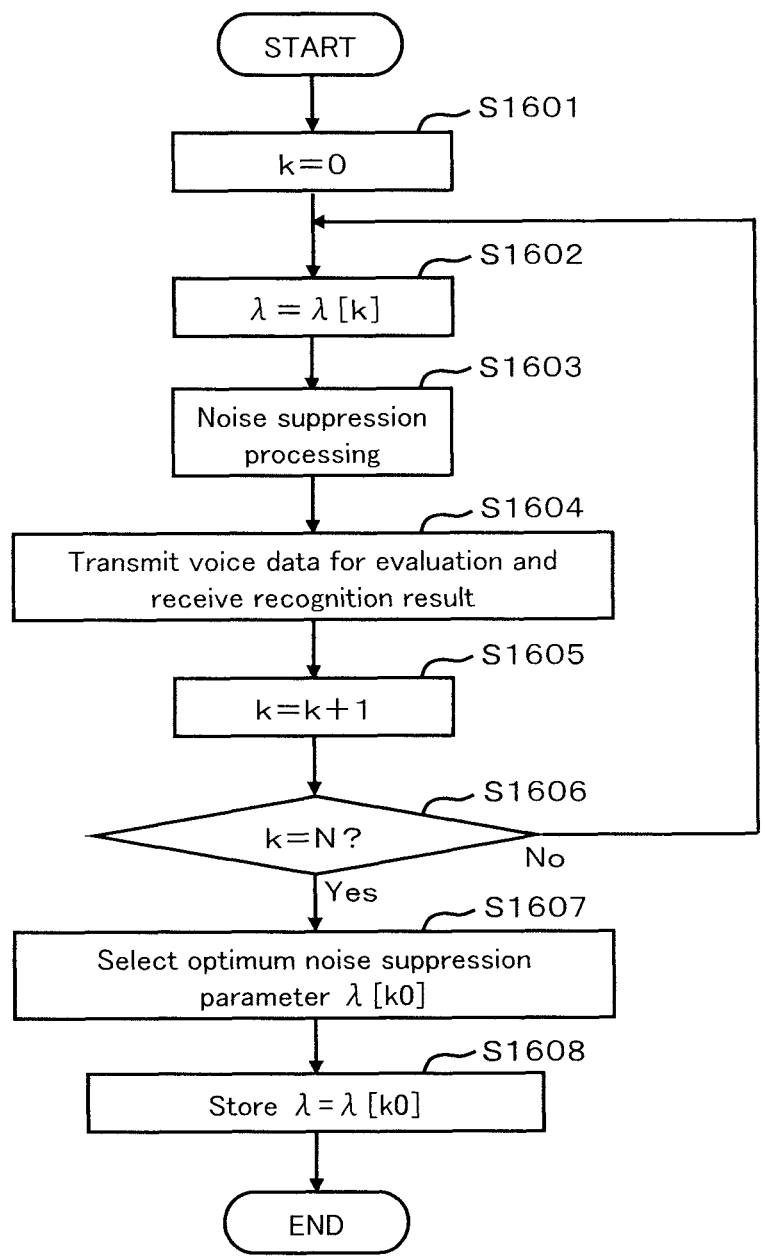
FIG. 16 is a flowchart illustrating an example of a processing of optimizing a noise suppression parameter according to the embodiment.

FIG. 16 is a flowchart illustrating an example of a processing of optimizing a noise suppression parameter (see FIG. 1 where necessary). In FIG. 16, it is assumed that N values from $\lambda[0]$ to $\lambda[N-1]$ are available as a candidate of the noise suppression parameter $\lambda$. Note that the variable k is used for identifying a noise suppression parameter $\lambda[k]$.

An evaluation means (not shown) of the processing part 150 sets a default value of the variable k at 0 (step S1601). The evaluation means of the processing part 150 sets a k-th noise suppression parameter $\lambda[k]$ at $\lambda$ (step S1602). The noise suppression module 118 performs a noise suppression processing on a voice data for evaluation using the noise suppression parameter $\lambda$ set in step S1602 (step S1603). At this time, if a single voice data for evaluation alone is used, voice recognition performance of the voice recognition server 104 cannot be sufficiently evaluated, a number of voice data for evaluation are subjected to similar processings so as to appropriately evaluate the voice recognition performance of the voice recognition server 104. The voice recognition performance is represented by, for example, a recognition rate obtained by dividing the number of correctly-recognized voice data by the number of executed voice recognition processings.

The noise suppression module 118 transmits the voice data for evaluation having been subjected to step S1603, to the voice recognition server 104. The history management module 128 receives a recognition result of the voice data for evaluation from the voice recognition server 104 (step S1604). The server evaluation means of the processing part 150 sets the variable k at k+1 (step S1605) and determines whether or not the value of the variable k is identical to N (step S1606). If the value of the variable k is not determined to be identical to N (if No in step S1606), the processing returns to step S1602. If the value of the variable k is determined to be identical to N (if Yes in step S1606), the processing advances to step S1607.

In step S1607, the parameter change module 126 selects, from among N parameter candidates, a value of the noise suppression parameter $\lambda[k_0]$ which has the highest recognition rate, as the optimum parameter. The parameter change module 126 then stores $\lambda[k_0]$ as a noise suppression parameter $\lambda$ to be newly used, in the noise suppression parameter storage part 120 (see FIG. 1) (step S1608) and terminates the processing shown in the flowchart.

<Variation>

In the aforementioned explanation, the voice data transferring device 110 is independently provided between the in-vehicle terminal 102 and the voice recognition server 104 as shown in FIG. 1. However, a variation is also possible in which the configuration of the voice data transferring device 110 is provided in the in-vehicle terminal 102.

Figure 17:
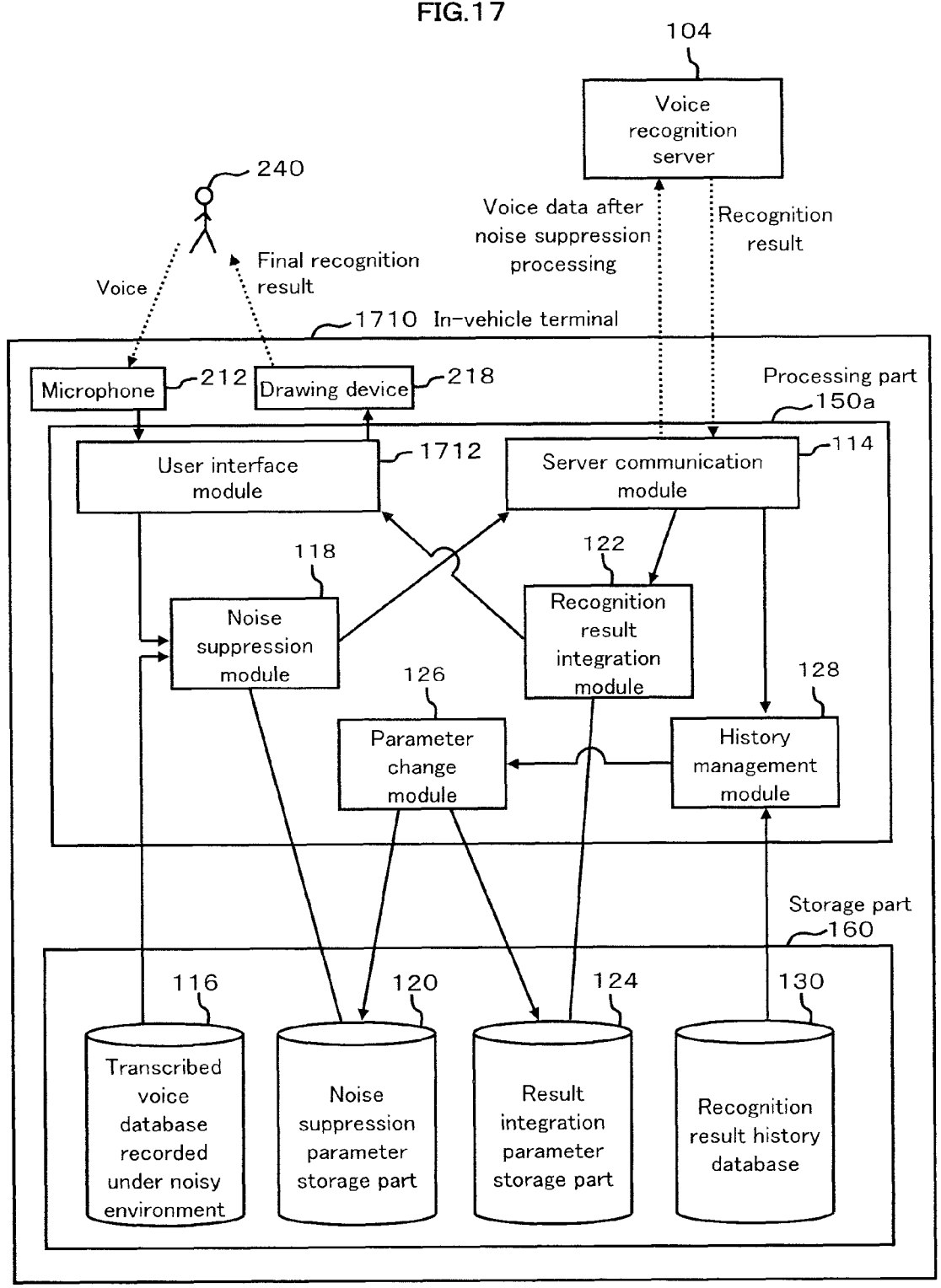
FIG. 17 is a block diagram illustrating a configuration example of an in-vehicle terminal having a function of the voice data transferring device according to a variation of the present invention.

FIG. 17 illustrates a configuration example of the variation. The same reference numerals are given to the building blocks having the same functions as those shown in FIG. 1 and FIG. 6. In FIG. 17, an in-vehicle terminal 1710 includes the microphone 212, a user interface module 1712, the drawing device 218, the server communication module 114, the transcribed voice database recorded under noisy environment 116, the noise suppression module 118, the noise suppression parameter storage part 120, the recognition result integration module 122, the result integration parameter storage part 124, the parameter change module 126, the history management module 128, and the recognition result history database 130.

In the configuration as shown in FIG. 17, a voice uttered by the user 240 is taken in from the microphone 212 via the user interface module 1712 to the noise suppression module 118. Further, a final recognition result outputted from the recognition result integration module 122 is also transmitted to the drawing device 218 or a speaker (not shown) via the user interface module 1712, without passing through a communications line. Even in such implementation, operating principles of the respective modules are similar to those described with reference to FIG. 1 to FIG. 16. That is, the configuration of the in-vehicle terminal 1710 shown in FIG. 17 can achieve advantageous effects similar to those of the voice data transferring device 110 shown in FIG. 1.

As described above, the voice data transferring device 110 according to the present embodiment, in intermediating between the in-vehicle terminal 102 and the voice recognition server 104, makes the noise suppression module 118 perform a noise suppression processing on a voice data for evaluation so as to check a change in voice recognition performance of the voice recognition server 104; transmits the voice data for evaluation to the voice recognition server 104; and receives a recognition result thereof. The voice data transferring device 110 sets a value of a noise suppression parameter which is used for a noise suppression processing or a value of a result integration parameter which is used for a processing of integrating a plurality of recognition results obtained from the voice recognition server 104, at an optimum value, based on the recognition result of the voice recognition server 104. This allows a suitable parameter to be set even if the voice recognition performance of the voice recognition server 104 varies.

That is, the intermediation of the voice data transferring device 110 between the in-vehicle terminal 102 and the voice recognition server 104 makes it possible to offer a voice recognition service with more stable quality than a direct voice recognition between the in-vehicle terminal 102 and the voice recognition server 104. Further, the in-vehicle terminal 1710 shown in the variation has the functions similar to those of the voice data transferring device 110. This allows the in-vehicle terminal 1710 to achieve advantageous effects similar to those of the voice data transferring device 110.

In this embodiment and the variation, the functions of the noise suppression module 118 are described assuming a case of performing a noise suppression processing. However, a processing of compressing an amount of information of a voice data (a processing of data manipulation) may also be performed in parallel.

In this embodiment, description has been made focusing on the voice data transferring device 110. However, another configuration is also possible in which the in-vehicle terminal 102, the voice data transferring device 110, and the voice recognition server 104 are combined into one unitary device (which may also be referred to as a voice recognition system).

The invention claimed is:

1. A voice data transferring device which intermediates between a terminal device and a voice recognition server, in which the terminal device: records a voice of a user when the user is speaking; transmits the speech voice as a voice data; receives a recognition result of the transmitted voice data; and outputs the recognition result to the user, and in which the voice recognition server: receives the voice data from the terminal device; recognizes the voice data; and transmits the recognition result of the voice data, the voice data transferring device comprising:
- a storage unit that stores therein a first parameter value used for performing a data manipulation processing on the voice data and a voice data for evaluation used for evaluating voice recognition performance of the voice recognition server;
- a data processing unit that performs a data manipulation processing on the voice data for evaluation using the first parameter value, synthesizes a first voice data from the voice data for evaluation, performs a data manipulation processing on the voice data received from the terminal device using the first parameter value, and synthesizes a second voice data from the voice data received from the terminal device,
- a server communication unit that transmits the first voice data to the voice recognition server, receives a first recognition result from the voice recognition server, transmits the second voice data to the voice recognition server, and receives a second recognition result from the voice recognition server;
- a terminal communication unit that transmits the second recognition result of the second voice data to the terminal device; and
- a parameter change unit that updates the first parameter value stored in the storage unit, based on the received first recognition result of the first voice data.

2. The voice data transferring device according to claim 1, wherein the storage unit further stores therein history information which includes a past first voice data having been previously transmitted to the voice recognition server and a past recognition result thereof, in association with each other, and
wherein the parameter change unit references the history information, compares the first recognition result of the first voice data received by the server communication unit with the past recognition result, and, if the received first recognition result of the first voice data is different from the past recognition result, updates the first parameter.

3. The voice data transferring device according to claim 2, further comprising
a processing unit that performs: on a voice data which have been previously recorded in an environment free from noise and whose speech contents are known, an addition processing of adding a noise data which is a data with a noise recorded therein, to the voice data, or the addition processing as well as a convolution processing of filtering the voice data according to transfer characteristics between the terminal device and a mouth of the user; and synthesizing a voice data for evaluation.

4. The voice data transferring device according to claim 3, wherein the processing unit: acquires, in the addition processing, from among the voice having been recorded by the terminal device when the user was speaking the speech, a section without voice as a noise data; and synthesizes a voice data for evaluation having a desired signal-to-noise ratio by adjusting a gain of the noise data.

5. The voice data transferring device according to claim 4, wherein the processing unit: acquires, in the addition processing, from among the voice having been recorded by the terminal device when the user was speaking, a voice in a section with voice; and adjusts a gain of a voice data of the voice data for evaluation based on a power of the voice in the section with voice.

6. The voice data transferring device according to claim 1, wherein the voice data transferring device is connected to a plurality of the voice recognition servers,
wherein the storage unit further stores therein a second parameter value which is used for integrating plural recognition results received from the plural voice recognition servers, into one recognition result,
wherein the voice data transferring device further comprises a recognition result integration unit that synthesizes one recognition result from the plural recognition results received from the plural voice recognition servers, using the second parameter value, and
wherein the terminal communication unit transmits the recognition result synthesized by the recognition result integration unit, to the terminal device.

7. The voice data transferring device according to claim 2, wherein the voice data transferring device is connected to a plurality of the voice recognition servers,
wherein the storage unit further stores therein a second parameter value which is used for integrating plural recognition results received from the plural voice recognition servers, into one recognition result,
wherein the voice data transferring device further comprises a recognition result integration unit that synthesizes one recognition result from the plural recognition results received from the plural voice recognition servers, using the second parameter value, wherein the parameter change unit, if the recognition result received from at least one of the voice recognition servers is different from the past recognition result in the history information, updates the second parameter value, and wherein the terminal communication unit transmits the recognition result synthesized by the recognition result integration unit, to the terminal device.

8. A terminal device having the voice data transferring device according to claim 1, the terminal device further comprising a unit that records a voice of a user when the user is speaking, outputs the speech voice as a voice data, and outputs a recognition result of the voice data to the user.

9. A method of transferring a voice data by a voice data transferring device which intermediates between a terminal device and a voice recognition server, in which the terminal device: records a voice of a user when the user is speaking; transmits the speech voice as a voice data; receives a recognition result of the transmitted voice data; and outputs the recognition result to the user, and in which the voice recognition server: receives the voice data from the terminal device; recognizes the voice data; and transmits the recognition result of the voice data, the voice data transferring device including a storage unit that stores therein a first parameter value used for performing a data manipulation processing on the voice data and a voice data for evaluation used for evaluating voice recognition performance of the voice recognition server, the voice data transferring method comprising the steps of:

a data processing step of performing a data manipulation processing on the voice data for evaluation using the first parameter value, synthesizing a first voice data from the voice data for evaluation, performing a data manipulation processing on the voice data received from the terminal device using the first parameter value, and synthesizing a second voice data from the voice data received from the terminal device, a server communication step of transmitting the first voice data to the voice recognition server, receiving a first recognition result from the voice recognition server, transmitting the second voice data to the voice recognition server, and receiving a second recognition result from the voice recognition server;

a terminal communication step of transmitting the second recognition result of the second voice data to the terminal device; and a parameter change step of updating the first parameter value stored in the storage unit, based on the received first recognition result of the first voice data.

10. A voice recognition system, comprising:

a terminal device that records a voice of a user when the user is speaking, transmits the speech voice as a voice data, receives a recognition result of the transmitted voice data, and outputs the recognition result to the user;

a voice recognition server that receives the voice data from the terminal device, recognizes the voice data, and transmits the recognition result of the voice data; and the voice data transferring device according to claim 6, wherein, in the voice data transferring device, the data processing unit performs a data manipulation processing on the voice data received from the terminal device using plural different first parameter values, and synthesizes plural second voice data from the manipulated voice data, the server communication unit transmits the plural second voice data to the voice recognition servers, and receives plural second recognition results from the voice recognition servers;

the recognition result integration unit synthesizes one recognition result from the plural recognition results received from the voice recognition servers, using the second parameter value, and the terminal communication unit transmits the recognition result synthesized by the recognition result integration unit to the terminal device.

* * * * *